United States Patent
Range et al.

(10) Patent No.: US 11,112,578 B2
(45) Date of Patent: Sep. 7, 2021

(54) OPTICAL ELEMENT SWITCHING SYSTEMS FOR AN ELECTRO OPTICAL SYSTEM

(71) Applicant: Raytheon Company, Waltham, MA (US)

(72) Inventors: Jake B. Range, McKinney, TX (US); Chris Shreve, Melissa, TX (US)

(73) Assignee: Raytheon Company, Waltham, MA (US)

( * ) Notice: Subject to any disclaimer, the term of this patent is extended or adjusted under 35 U.S.C. 154(b) by 253 days.

(21) Appl. No.: 16/354,050

(22) Filed: Mar. 14, 2019

(65) Prior Publication Data
US 2020/0292784 A1    Sep. 17, 2020

(51) Int. Cl.
| | |
|---|---|
| G02B 7/182 | (2021.01) |
| G02B 7/00 | (2021.01) |
| G02B 7/04 | (2021.01) |
| G02B 7/14 | (2021.01) |
| G02B 15/04 | (2006.01) |
| H04N 5/225 | (2006.01) |

(52) U.S. Cl.
CPC ........... *G02B 7/1827* (2013.01); *G02B 7/003* (2013.01); *G02B 7/04* (2013.01); *G02B 7/14* (2013.01); *G02B 15/04* (2013.01); *H04N 5/2254* (2013.01)

(58) Field of Classification Search
CPC ........ G02B 7/16; G02B 7/1827; G02B 7/003; G02B 7/04; G03B 17/12; G03B 17/14; G03B 25/007
USPC ............... 359/821; 396/73–75, 361; 351/233
See application file for complete search history.

(56) References Cited

U.S. PATENT DOCUMENTS

| | | | | |
|---|---|---|---|---|
| 1,084,561 | A * | 1/1914 | Ouimette | A61B 3/04 351/233 |
| 2,212,597 | A * | 8/1940 | Haddad | A61B 3/02 351/233 |
| 2,502,609 | A * | 4/1950 | Suppiny, Sr. | G03B 17/12 359/672 |
| 5,263,280 | A | 11/1993 | Dilcher | |
| 5,541,820 | A | 7/1996 | McLaughlin | |

(Continued)

FOREIGN PATENT DOCUMENTS

| | | |
|---|---|---|
| EP | 1168058 A1 | 1/2002 |
| GB | 25761 | 2/1911 |

(Continued)

OTHER PUBLICATIONS

Invitation to Pay Additional Fees for International Application No. PCT/US2020/013474 dated May 4, 2020, 13 pages.

(Continued)

*Primary Examiner* — Zachary W Wilkes

(57) ABSTRACT

Various exemplary systems for transporting and switching optical components are disclosed. The system includes carriers disposed about a housing and configured to follow a carrier guide system to switch optical components at the optical prescription center of the optical path. In one example, a device is disclosed that reduces the packaging form factor through the use of carriers rotated about an inverted radius along a track adjacent to a limiting peripheral boundary. The system and device are configured to switch optical components while minimizing the form factor of the optical device. Methods of accomplishing these tasks are also disclosed.

14 Claims, 19 Drawing Sheets

(56) References Cited

U.S. PATENT DOCUMENTS

| | | |
|---|---|---|
| 6,262,863 B1 | 7/2001 | Ostwald et al. |
| 6,563,278 B2 | 5/2003 | Roman |
| 2015/0212394 A1* | 7/2015 | Ozawa .................. G03B 17/14 |
| | | 348/360 |

FOREIGN PATENT DOCUMENTS

| | | | |
|---|---|---|---|
| JP | S59-21844 A | 2/1984 | |
| JP | 59218414 A * | 12/1984 | ............... G02B 7/14 |
| JP | S59-218414 A | 12/1984 | |
| KR | 2010-0030891 A | 3/2010 | |

OTHER PUBLICATIONS

Invitation to Pay Additional Fees for International Application No. PCT/US2020/013474 dated Jun. 10, 2020, 13 pages.

\* cited by examiner

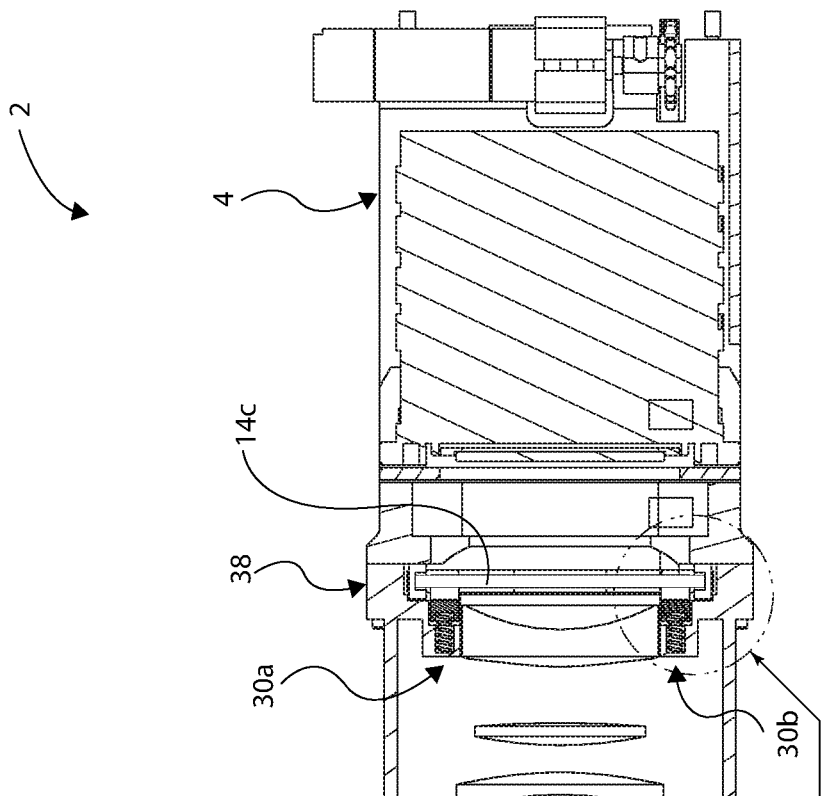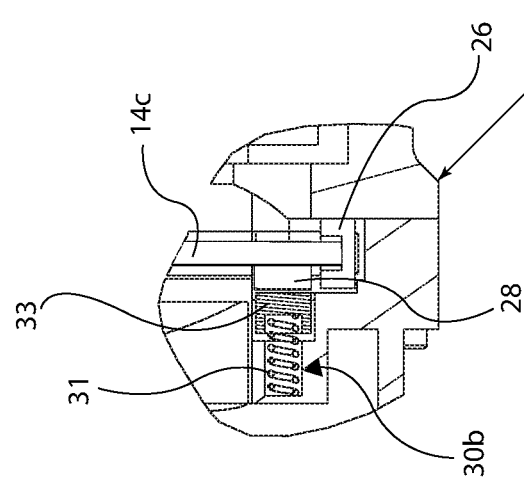

OPTICAL ELEMENT SWITCHING SYSTEMS FOR AN ELECTRO OPTICAL SYSTEM

BACKGROUND

Systems and mechanisms for moving optical components in and out of the optical path of an optical device are of increasing demand in optical imaging and surveillance applications. Systems to switch optical components, such as filters, lenses, mirrors, prisms, etc., generally require large areas to accommodate the optical components while not in use. For example, optical switching mechanisms for a filter optical component conventionally include a wheel or a line of filters for selectively switching the optical filters. While one optical filter is in use, several filters that are not in use must be accommodated in the design of the optical device.

A wheel of filters enables a rotational mechanism to select an appropriate filter for an optical recording device but the wheel mechanism requires a large swath of clearance outside the optical path to accommodate the filters not in use. The total area needed for the wheel and the optical device is referred to as the form factor and defines the area that must be used in the design of the device. In a linear switching mechanism, filters are lined up horizontally or vertically and require a large linear form factor (e.g., area) for the filters not in use. The linear mechanism requires accommodation for unused filters in a top to bottom or side to side configuration. The form factor includes any area required to accommodate the unused optical components.

For a wheel, the form factor includes the area of the circle holding unused optical components. For a linear system the form factor includes the area from side to side or top to bottom used for storing unused optical components. In either a linear or wheel configuration, a large area of space must be designed into the optical device to accommodate the filters not presently in the optical path, which can dictate undesirable design constraints in optical devices used in various applications.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 5A illustrates a cross-sectional top view of the optical system of FIG. 1, taken along lines 5-5 in FIG. 2;

FIG. 5B illustrates a detailed cross-sectional top view of the portion of the optical system of FIG. 1 identified by the dotted lines in FIG. 5A;

Figure 1:
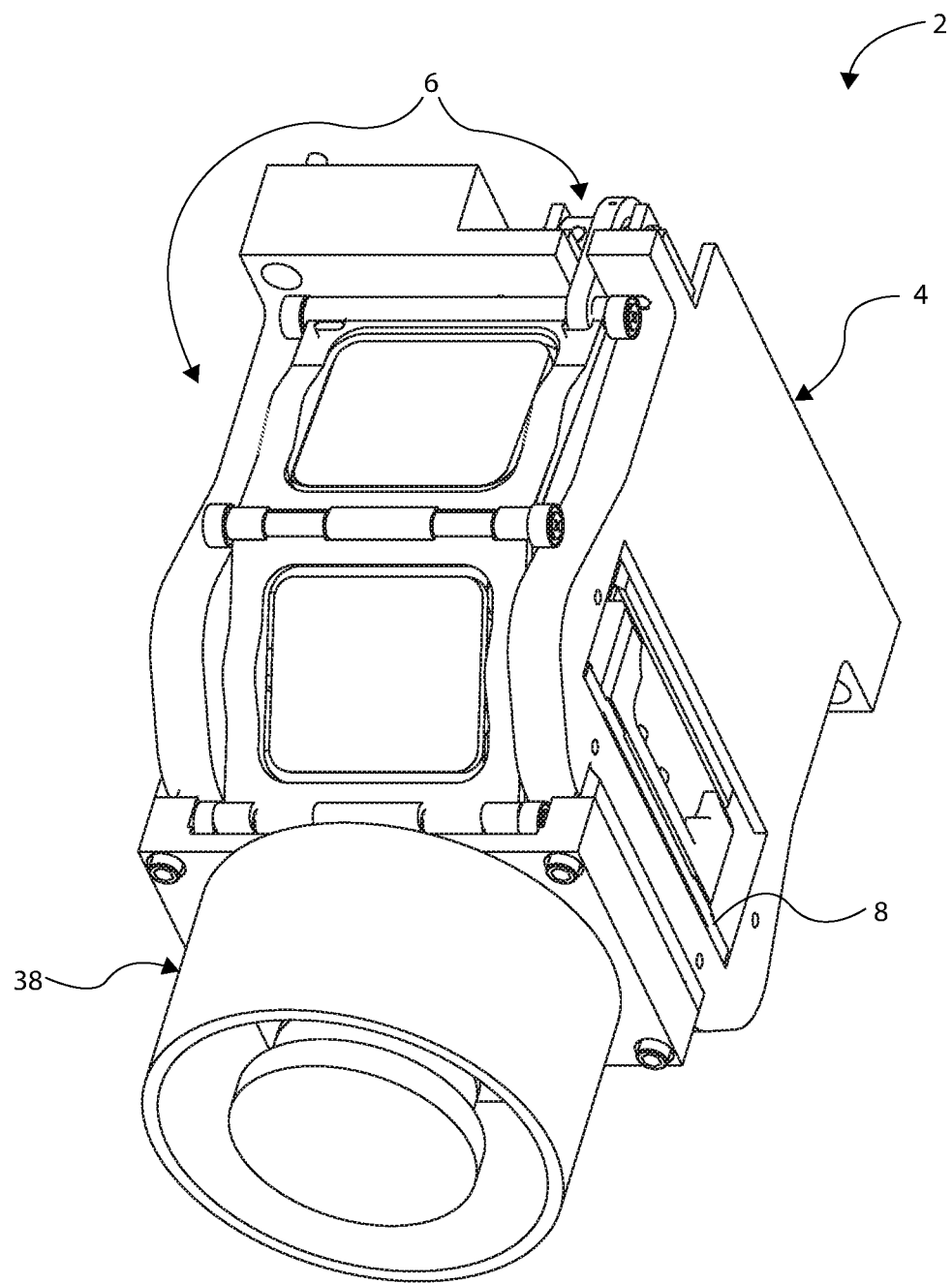
FIG. 1 illustrates a isometric view of an optical system in accordance with an example of the present disclosure, the optical system being operable to switch individual optical components in and out of an optical path.
Figure 2:
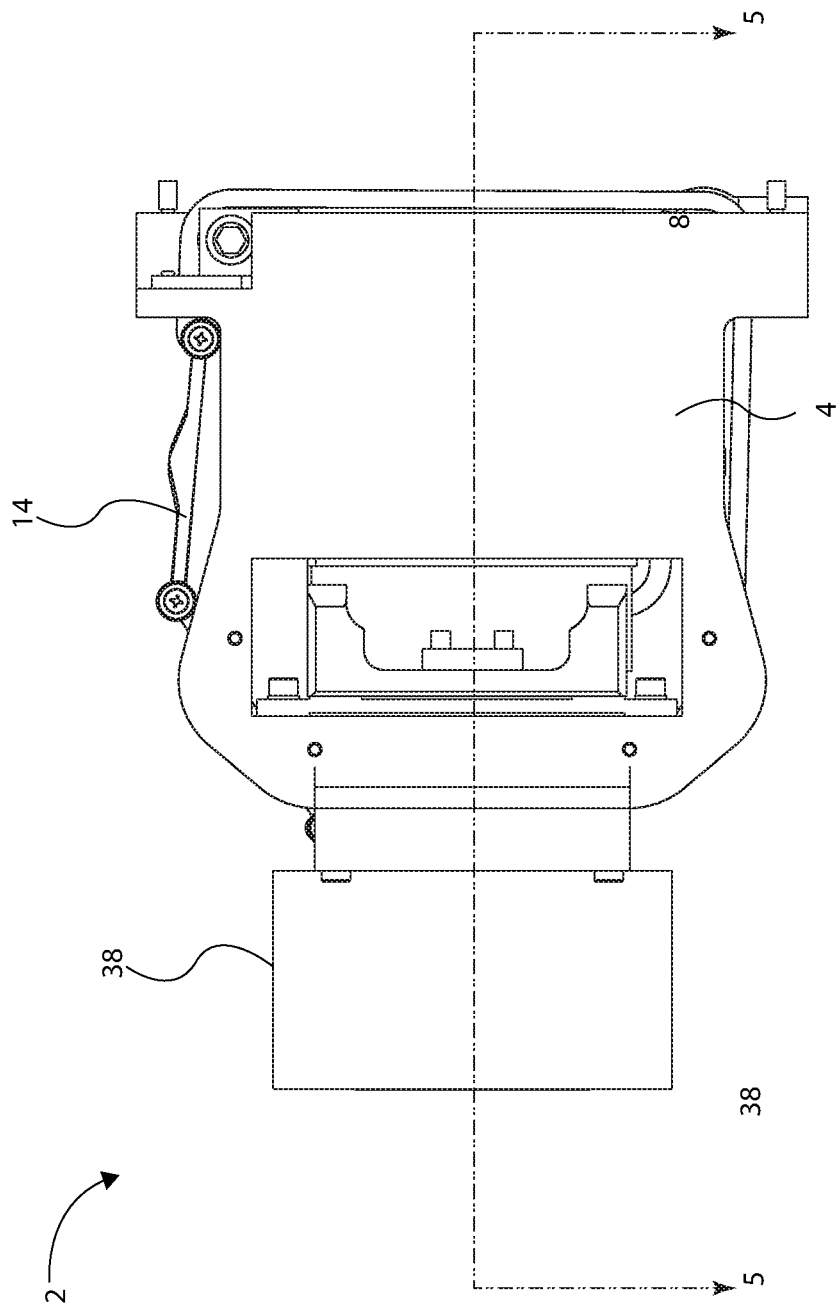
FIG. 2 illustrates a side view of the optical system of FIG. 1.
Figure 3:
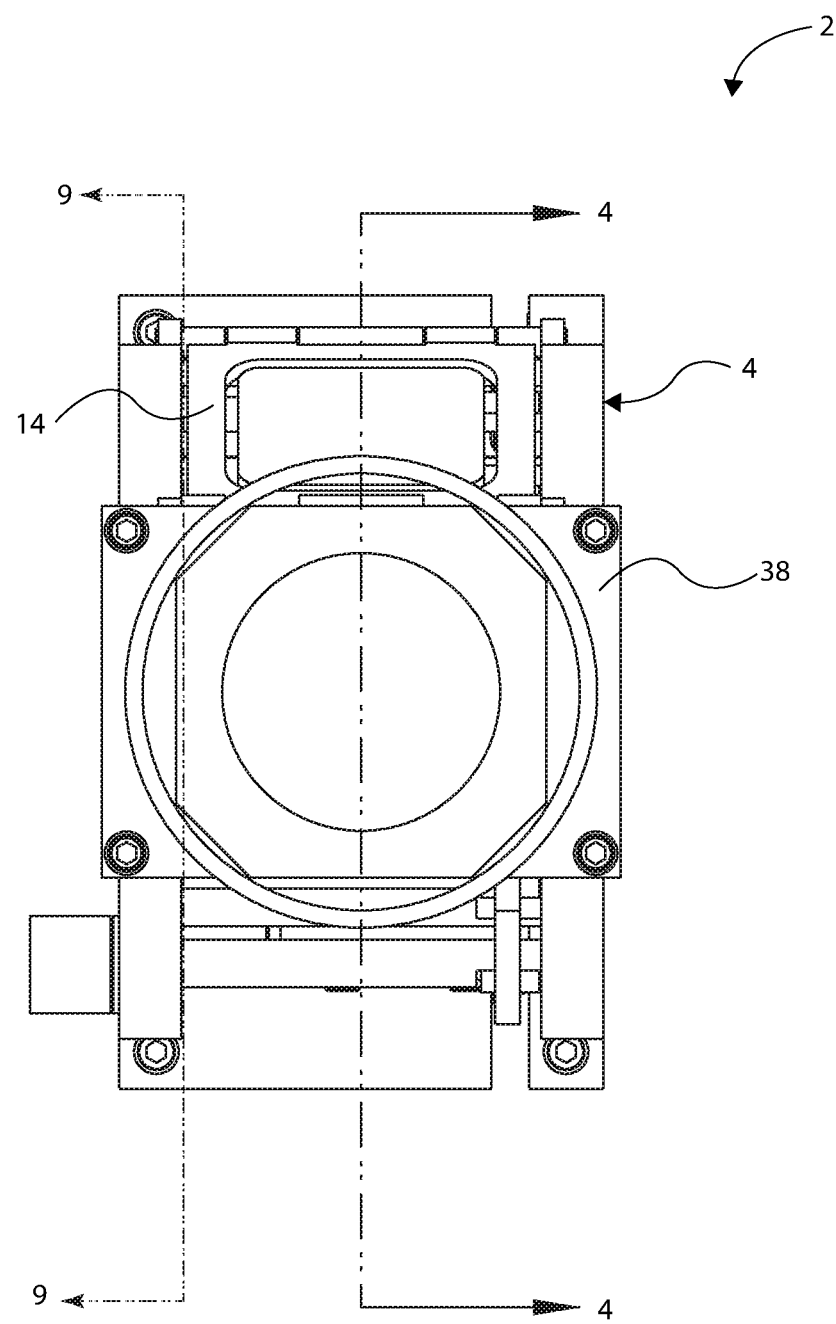
FIG. 3 illustrates a front view of the optical system of FIG. 1.
Figure 4:
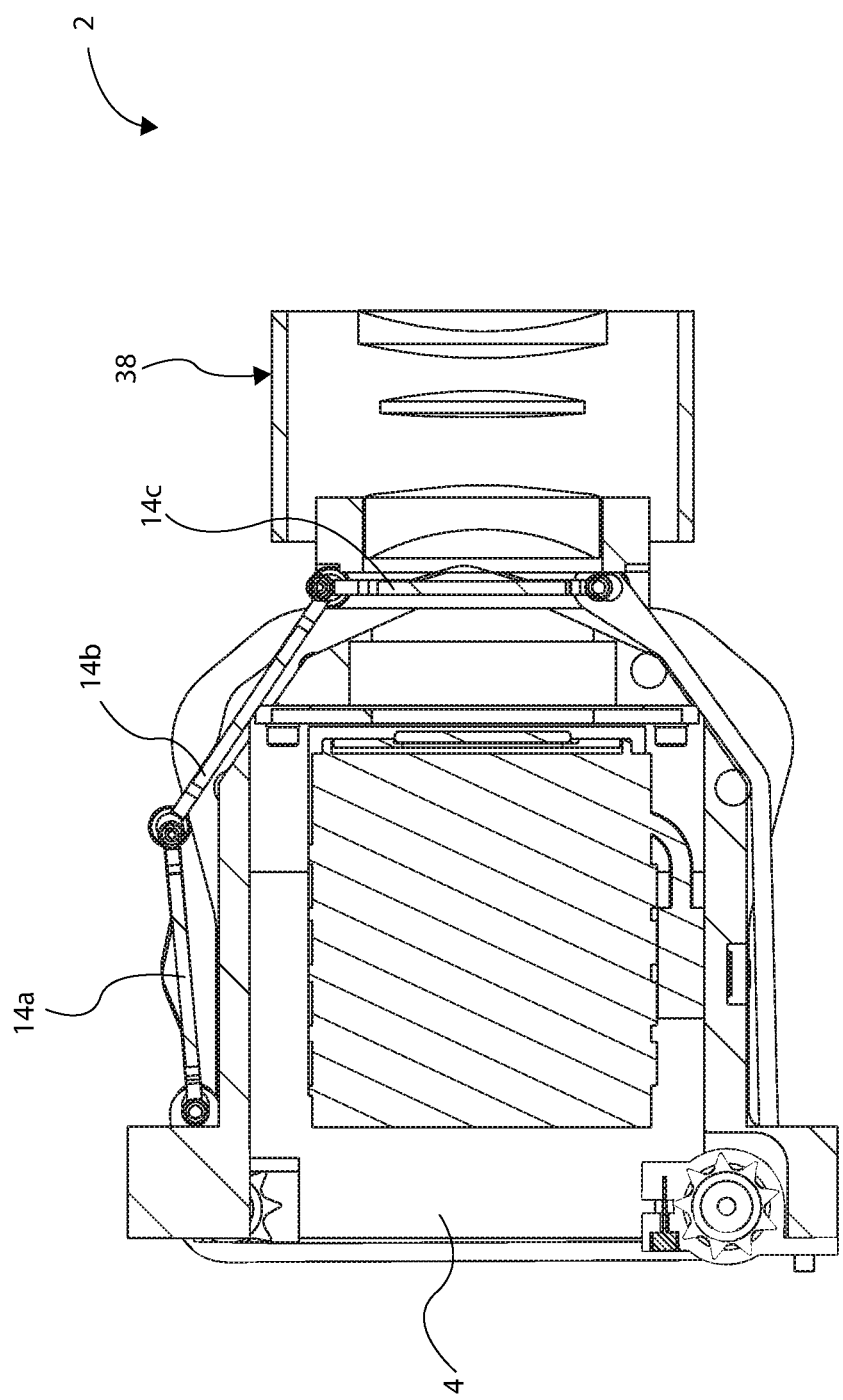
FIG. 4 illustrates a cross-sectional side view of the optical system of FIG. 1, taken along lines A-A in FIG. 3.
Figure 6:
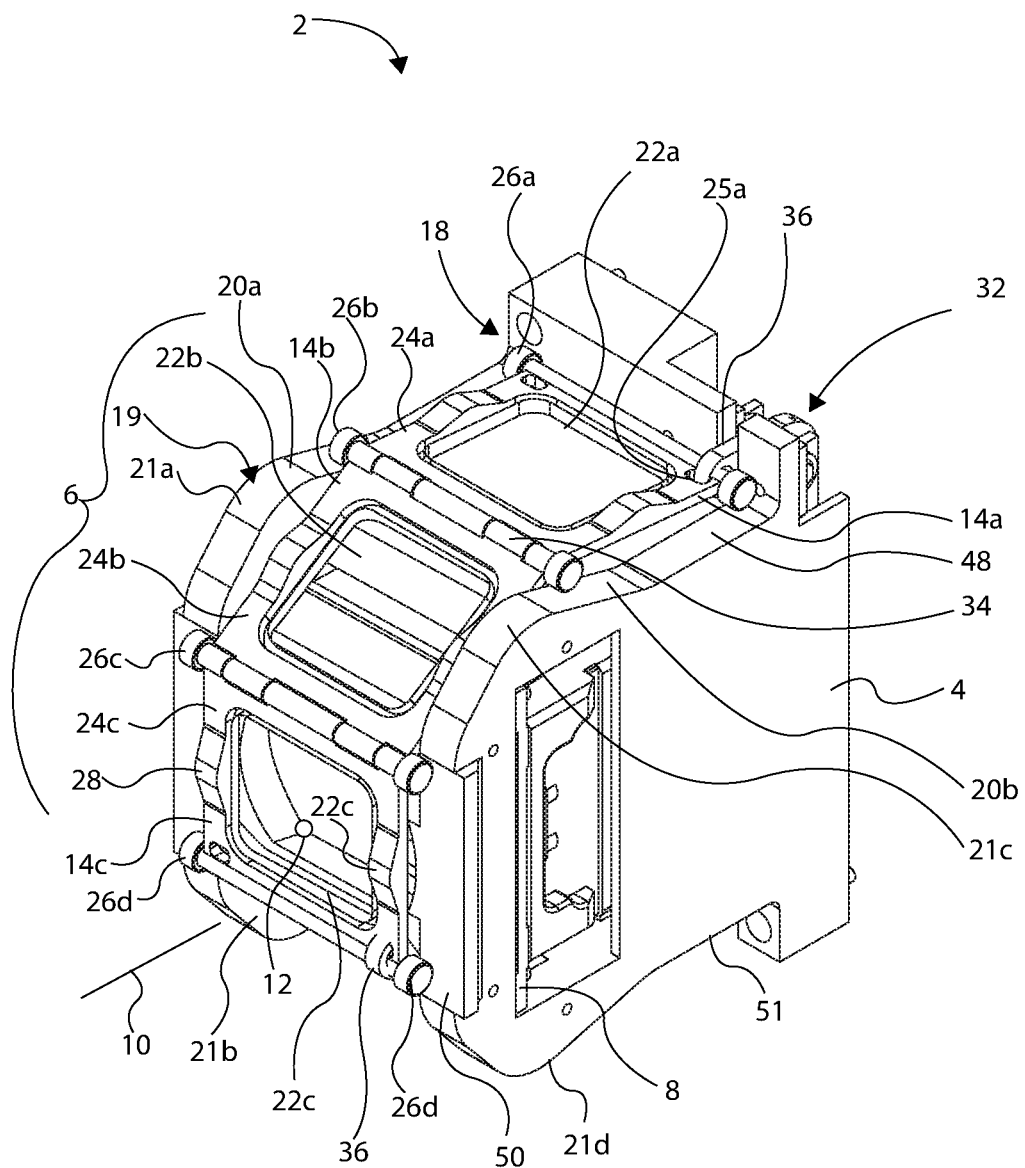
FIG. 6 illustrates the optical system of FIG. 1 with the enclosure hidden from view.
Figure 7:
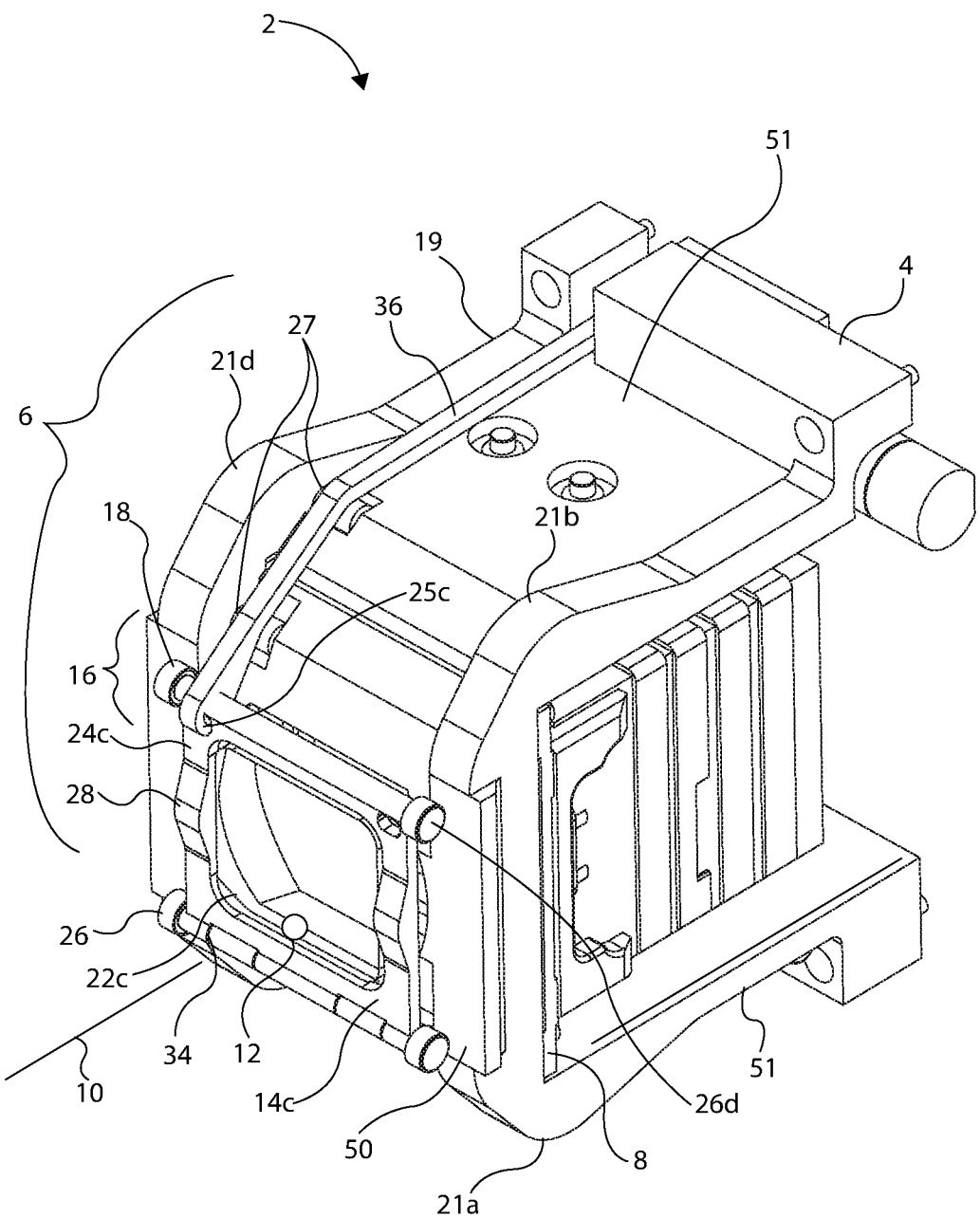
FIG. 7 illustrates a bottom isometric view of the optical system of FIG. 1.
Figure 8:
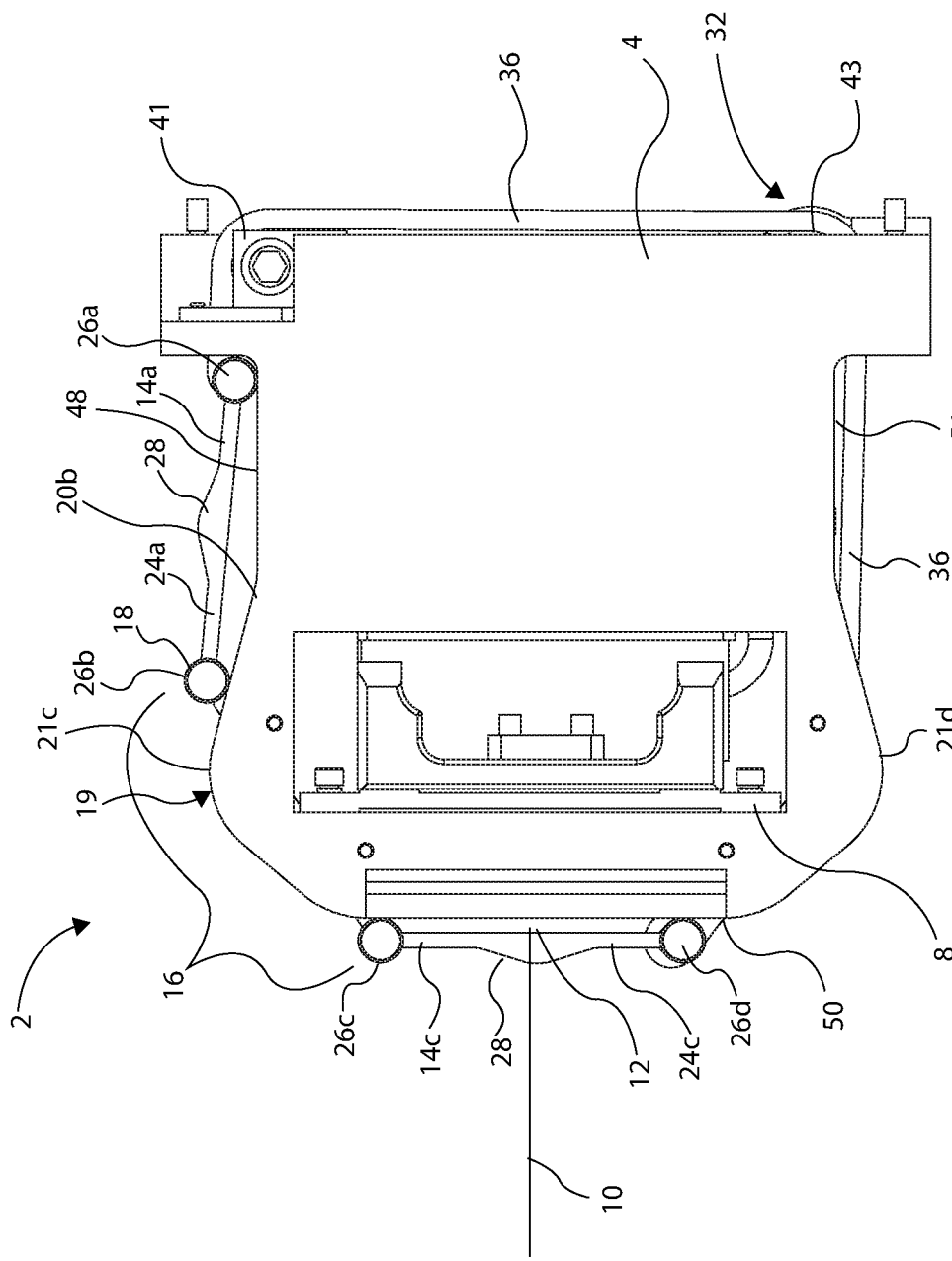
FIG. 8 illustrates a side view of the optical system of FIG. 1.
Figure 9:
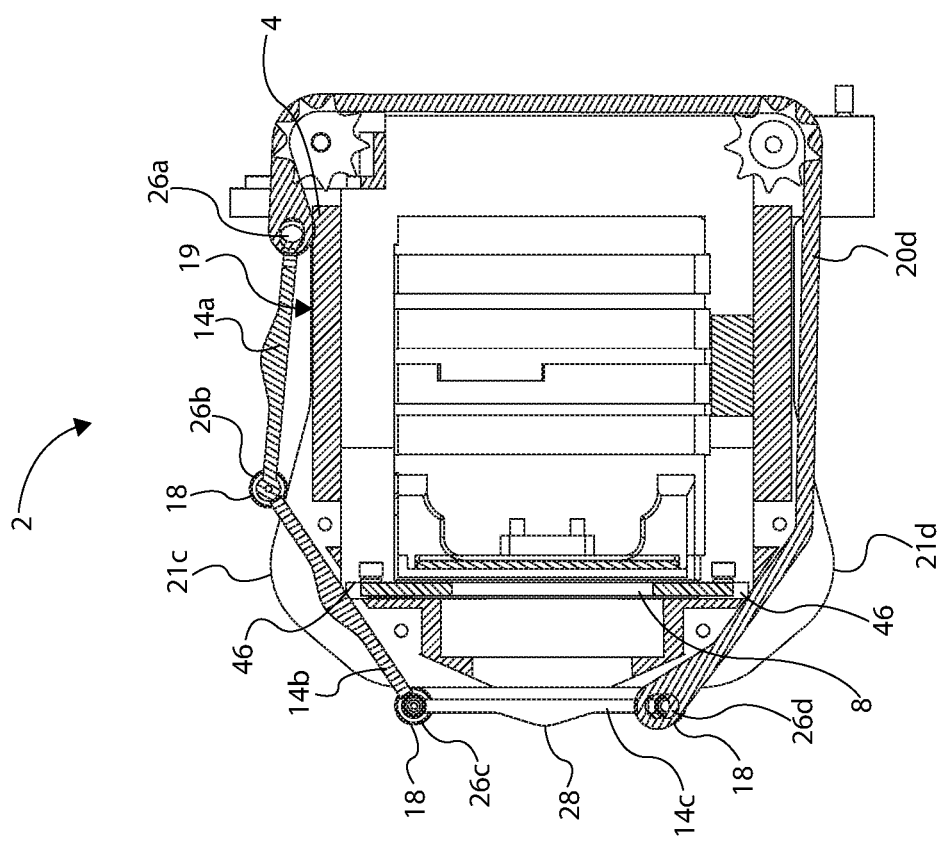
FIG. 9 illustrates a cross-sectional side view of the optical system of FIG. 1.
Figure 10:
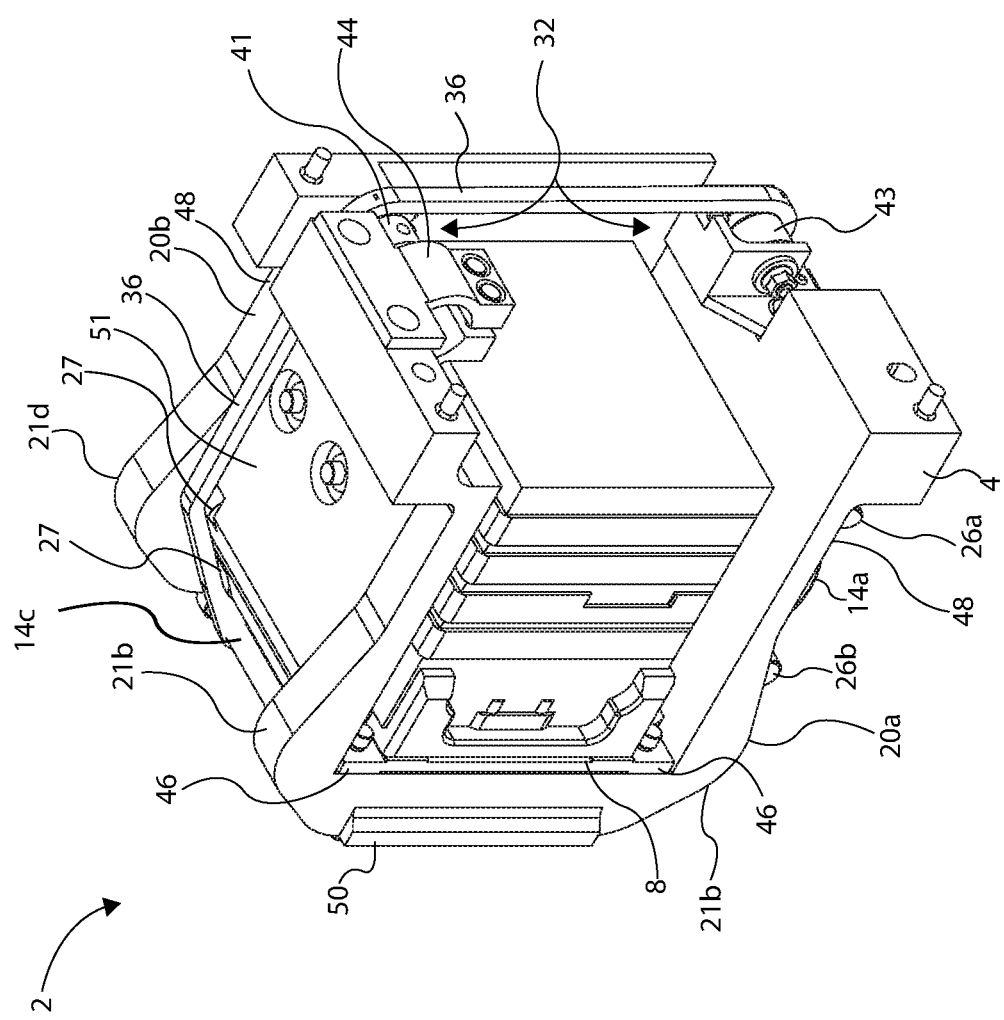
FIG. 10 illustrates a rear isometric view of the optical system of FIG. 1 (without the enclosure attached), the optical system being shown inverted.
Figure 11:
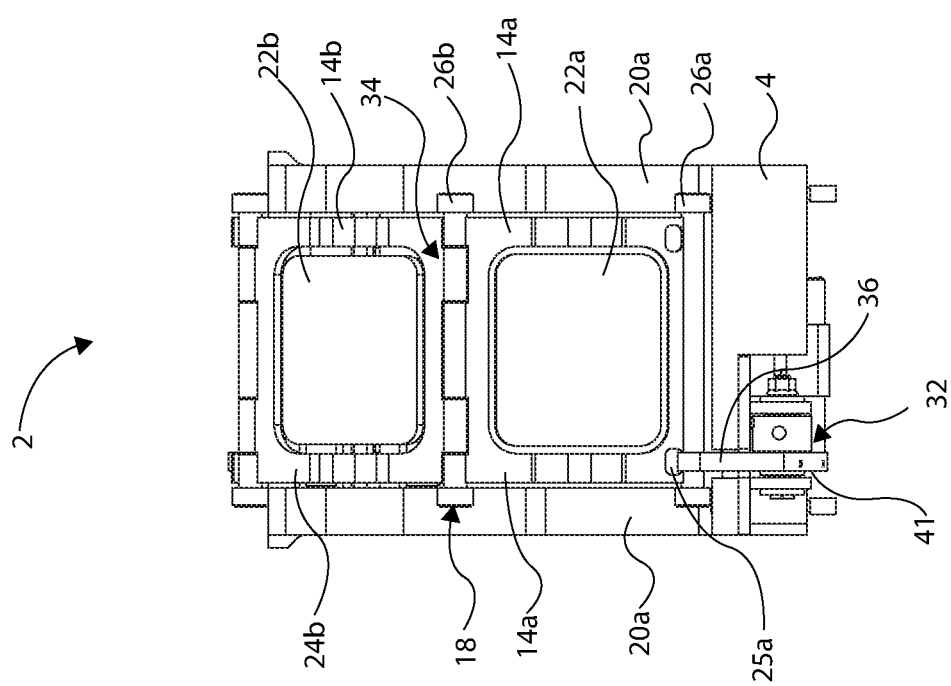
FIG. 11 illustrates a top view of the optical system of FIG. 1.
Figure 12:
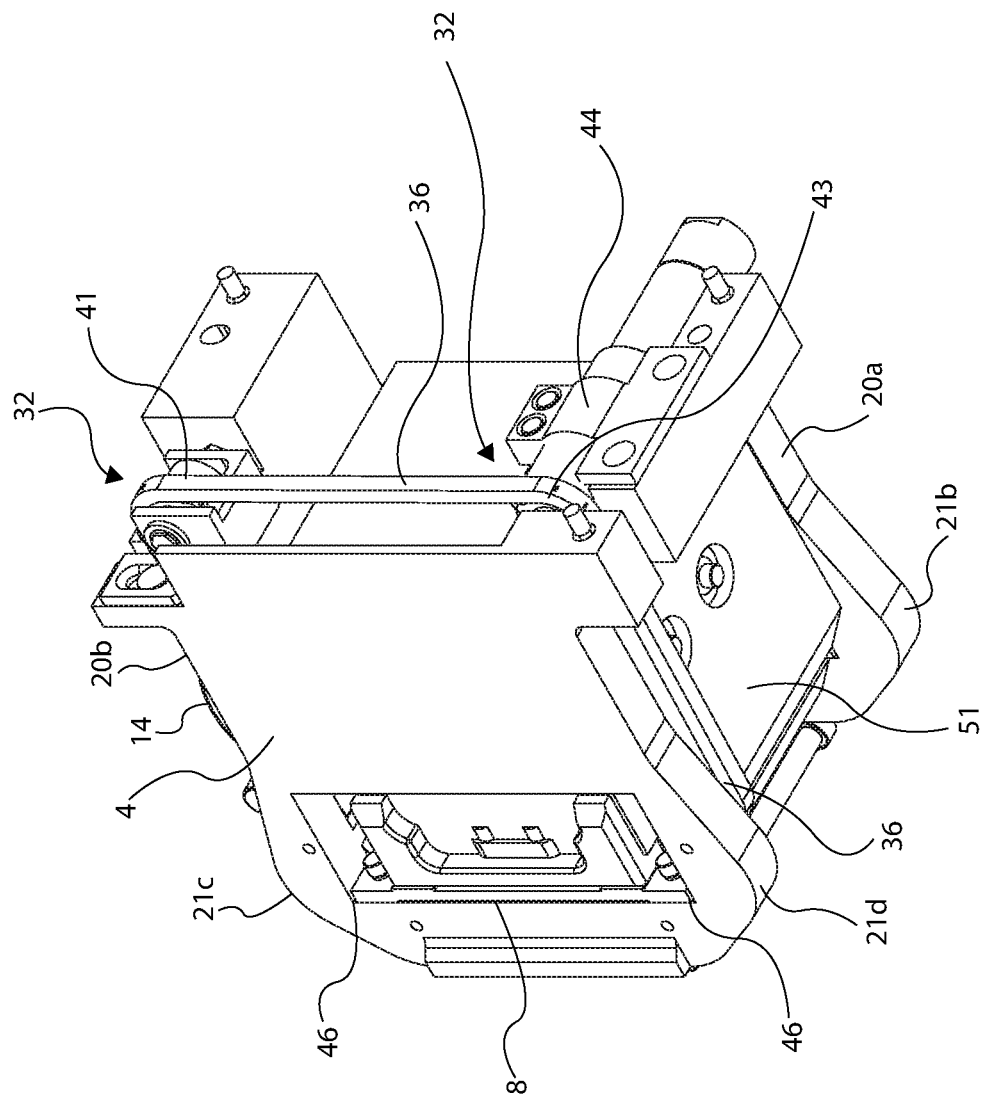
FIG. 12 illustrates a rear isometric view of the optical system of FIG. 1.
Figure 13:
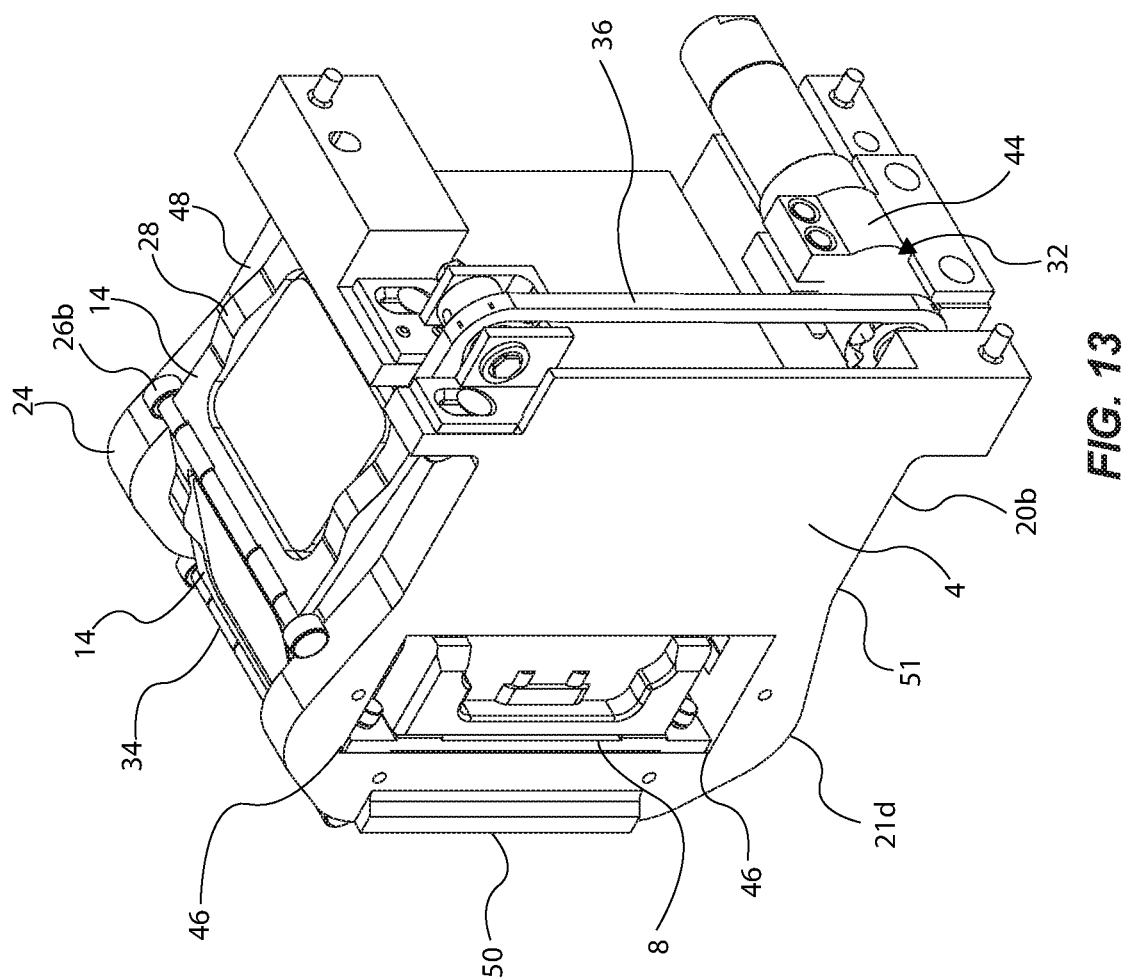
FIG. 13 illustrates a side isometric view of the optical system of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

An optical system is disclosed that substantially minimizes the space required for storage of unused optical components and minimizes the overall form factor of the optical device. More specifically, an optical system is disclosed in which the filters and optical components not in use can be stored outside the optical path in a way that does not require a large area beyond the profile of the optical device. In other words, disclosed is a system and method for storing optical components that minimizes the form factor of the optical device.

In one example, the optical system includes a housing operable to support one or more optical sensors. The housing defines an optical path through an optical prescription center of the housing. The optical system further includes an optical element switching system associated with the housing.

The optical element switching system includes a plurality of carriers, a carrier guide system and a drive system. The plurality of carriers is movable about the housing, and each carrier includes a frame and an optical component supported by the frame. The carrier guide system includes a housing interface that slidingly interfaces with a carrier interface. The carrier guide system is operable to slidingly support the plurality of carriers relative to the housing. The drive system is operable to selectively move and position the plurality of carriers about the carrier guide system in and out of the optical path.

An optical device is described. The optical device can include a housing operable to support one or more optical sensors and an optical element switching system associated with the housing. The housing defines an optical path through an optical prescription center. The optical element switching system associated with the housing, includes a plurality of carriers movable about the housing, and each comprising a frame and an optical component supported by the frame. The optical element switching system further includes a carrier guide system comprising a housing interface that engages a carrier interface. The carrier guide system is operable to movably support the plurality of carriers relative to the housing. The optical element switching system further includes a drive system operable to selectively move and position the plurality of carriers along the carrier guide system in and out of the optical path.

An optical system is disclosed that rotates carriers about a cam to avoid interference with a peripheral boundary of a housing. The optical system includes a housing, a sensor, and an optical element switching system. The housing includes a peripheral boundary and defines an optical path through an optical prescription center. The sensor is disposed within the housing, and the sensor defines, at least in part, the peripheral boundary of the housing. The optical element switching system comprises at least one carrier, a carrier guide system, and a drive system. The carrier is movable about the housing and includes a frame and an optical component supported by the frame. The carrier guide system includes a housing interface that interacts with a carrier interface. The carrier interface tracks, at least in part, the peripheral boundary of the housing. The carrier interface further includes a cam section that deviates from the peripheral boundary and that effectuates rotation of the carrier from a first surface of the housing out of the optical path to a second surface of the housing containing the optical prescription center. The drive system operates to selectively move and position the carrier along the carrier guide system in and out of the optical path.

In one method of the disclosure, optical components of an optical system are switched. The method includes movably supporting a plurality of carriers about a housing, each of the carriers comprising an optical component. The method further includes locating a first carrier at an optical prescription center of the housing such that the optical component of the first carrier is within an optical path, and positioning a second carrier with its associated optical component out of the optical path. A drive system operates to rotate the second carrier about a cam section to orient the second carrier within the optical path and to move the first carrier out of the optical path. The drive system of the carrier guide system locates the second carrier at the optical prescription center, such that the optical component of the second carrier is moved into and centered at the optical prescription center of the optical path.

To further describe the present technology, examples are now provided with reference to FIGS. 1-15. An electro optical system or simply an optical system 2 is disclosed, which optical system 2 is designed for tightly packaged electro optical systems, wherein the optical system 2 operates to keep the switched optical elements or components as close to the imager and sensor as possible. The optical system 2 can comprise a housing 4, a multi-optical element switching system 6 supported by the housing 4 and operable within and to define a sweep path for a plurality of optical components or elements, and an enclosure 38, which in this case comprises a fixed optical lens assembly, but could be a fold mirror, cover or any part of an electro optical assembly or design. The optical system 2 can further comprise one or more sensors, which can be disposed in and supported by the housing 4 (e.g., see sensor 8). The optical system 2 provides an optimizable sweep path (the path one or more optical elements or components are caused to travel by the optical element switching system 6 when being swept in and out of an optical path of the optical system 2) for a total form factor that stays much closer to the optical prescription center. This leaves adjacent space or real estate available for other needed components and facilitates tight packaging of these as well. Compared to prior electro optical systems, the optical systems disclosed herein facilitate a low overall or total switching system sweep volume.

The housing 4 can define an optical path 10 of a signal (e.g., light or electromagnetic waves), wherein the optical path 10 can facilitate the signal passing to and contacting the one or more sensors 8 disposed within the housing 4. The optical path 10 can include an optical prescription center 12. In other words, the housing 4 can define the optical path 10 the signal must pass through to interact with the one or more sensors 8 disposed within the housing 4, and the signal can follow the optical path 10 to interact with the one or more sensors 8. Sensor types that are contemplated herein can include, but are not limited to, SWIR, Image Intensified or low light, TV, Day TV, Lidar, MWIR, LWIR, and others. In addition, it is contemplated that the sensor types could still further comprise laser receivers, quad detectors. Those skilled in the art will recognize still other sensors that may be incorporated.

The housing 4 can support and position or locate the one or more sensors 8 within the optical path 10. The one or more sensors 8 can include optical or electrical indicators of an optical view. In one example, the one or more sensors 8 can comprise one or more cameras operable to record objects in the optical view of optical path 10. The one or more sensors 8 can relay information in real time to a connected or remote computer and/or store the information in external memory for analysis and review at a later time.

In one example, the housing 4 can support the optical element switching system 6. The optical element switching system 6 can comprise and is configured to facilitate the transport or conveyance of one or more individual carriers, with its/their associated optical component(s), about a carrier guide system (e.g., see carriers 14a-c operable with the carrier guide system 16, although three carriers is not intended to be limiting in any way, with the optical system 2 being capable of comprising more or less than three carriers). The carrier guide system 16 is configured to move the carriers 14a-c, with their associated and respective optical components 22a-c, in and out of a location in the optical path 10 of the housing 4. In the example shown, the optical element switching system 6 can comprise the one or more carriers 14a-c and the carrier guide system 16. The optical switching system 6 can further comprise a drive system 32, which is operable (e.g., actuatable) to drive the carriers 14a-c via the carrier guide system 16 about the optical path 10 in and out of the optical path 10 and/or the optical prescription center 12, such as is programmed or as is selected or directed by a user. The one or more carriers 14a-c can be selectively positioned to place their respective optical component 22 within the optical path 10, as described herein. The one or more carriers 14a-c can be caused to move about the housing 4 in different orientations relative to the housing 4.

In the case of multiple individual carriers, such as carriers 14a-c, each of these can be pivotally coupled to at least one other carrier adjacent thereto. For example, the carrier 14a can be pivotally coupled to the carrier 14b, and the carrier 14b, can be pivotally coupled to both the carrier 14a and the carrier 14c. The carrier 14c can be pivotally coupled to the carrier 14b. Pivotally coupled carriers 14a-c facilitates each carrier being able to move in a rotational degree of freedom relative to at least one other carrier, which rotational degree of freedom can be about an axis of pivot defined by the coupling arrangement between the carriers 14a-c. In one example, the carriers 14a-c can be pivotally coupled together via a hinge arrangement or system formed in the carriers 14a-c, which hinge system can comprise a pin jointed coupling configuration. The carriers 14a-c can be configured to comprise a low-profile. By being coupled together, not only do the carriers 14a-c pivot relative to one another, but translational movement of any one carrier results in translational movement of any other coupled carrier(s). In addition, the individual carriers 14a-c facilitate flexibility and a low total swept volume of the optical system 2. The pivotally coupled carriers 14a-c can be operably coupled to the drive system 32, such as via a belt or chain. When one of the carriers 14a-c is centered at the optical prescription center 12 of the optical path 10, the drive system 32 can be caused to discontinue moving and to stop driving the carriers 14a-c about the carrier guide system 16. The housing 4 can provide structural support to one or more components of the optical element switching system 6, such as the carrier guide system 16 and the drive system 32. This system and process will be discussed in greater detail below.

The carriers 14a-c can each comprise and support one or more optical elements or components (see optical components 22a-c, respectively). The carriers 14a-c can further support and position the optical components 22a-c about the housing 4, and can facilitate carrying these into the optical path 10. More specifically, the carriers 14a-c can each comprise a frame (see frames 24a-c, respectively), which frames 24a-c are configured to receive and support the optical components 22a-c, and which frames comprise the coupling interface used to pivotally couple one carrier to one or more other carriers. In one example, the frames 24a-c of the respective one or more carriers 14a-c can comprise a structure sized and configured to encase, envelop, circumscribe or surround the respective supported optical components 22a-c about a perimeter of the optical components 22a-c, such that the frames 24a-c provide structural support to the optical components 22a-c while providing and defining a window or aperture through the frames 24a-c through which the signal can pass and interact with the optical components 22a-c once any one of the respective carriers 14a-c are placed within the optical path 10.

When one of the optical components 22a-c (e.g., see optical component 22c of carrier 14c) is centered in the optical prescription center 12 of the optical path 10, the in-place optical component 22c can affect or act upon the incoming signal in desired ways. For instance, when in place within the optical path 10, the optical component 22c can act on the signal passing through the optical path 10 or optical prescription center 12 of the housing 4 and impinging on the optical component 22c, such as to filter, alter, enhance or otherwise act upon or affect the signal. While not intending to be limiting in any way, in some examples, the optical components 22a-c can include or function as a ray-blocking element, an aperture stop, a uniform temperature black surface, a mirror, a grating, a prism, a filter (either a polarization filter or spectral filter), a lens, a spoiler lens, a shutter, an image fusion source, an internal multi-spectral alignment (IMA) source, a thermal reference source for non-uniformity correction (NUC), a field of view (FOV) switcher, a beam splitter, or other types of elements or types of optical components.

In some examples, a single carrier can include and support a plurality of optical components. In still other examples, multiple carriers, each comprising one or more optical components, can be placed in the optical path 10, such as to act on or affect the signal in multiple ways, such as to direct the signal to one or more sensors or to focus or intensify the signal at a particular sensor. Those skilled in the art will recognize the many available functions and benefits made possible by the optical system 2 discussed herein.

The carriers 14a-c can each have one or more protrusions formed in or on the frames 24a-c, respectively, which protrusion(s) can be configured to extend outward or away from the surface of the frames 24a-c. In the example shown, each carrier 14a-c comprises a plurality or set of protrusions located on opposing sides of the frames 24a-c. In one aspect, the protrusions can be operable as detents to provide simple and accurate positioning of the carriers 14a-c within the prescription center 12. In another aspect, the protrusions can be operable as spring loaded reaction points to prevent motion of the optical components of the carriers if the optical system is subjected to vibrations. Indeed, the protrusions 28 can be operable to stabilize the carriers 14a-c and the associated optical components 22a-c, respectively, in position within the optical prescription center 12 as the individual carriers 14a-c are moved into position therein. Depending upon the type of environment in which the optical system 2 is being used, the protrusions 28 can provide stiffness to the optical component to protect against vibration in the optical system 2, and diminish the impact of the vibrations on the optical system 2. The protrusions 28 can extend from an outward facing surface of the frames 24a-c, and in one example, can have a curved configuration. While each of the carriers 14a-c can be configured the same or differently, in the example shown in FIGS. 1-14, the carriers 14a-c are configured similarly, with the respective frames 24a-c being configured the same. As such, the carrier 14c is shown as having a set of protrusions 28 on opposing sides of its frame 24c, and is further shown as being in position within the optical prescription center 12. The carriers 14*a-b* also have a set of protrusions, but these are not labeled or discussed as they function the same as the protrusions 28 of the carrier 14*c*.

Figure 14:
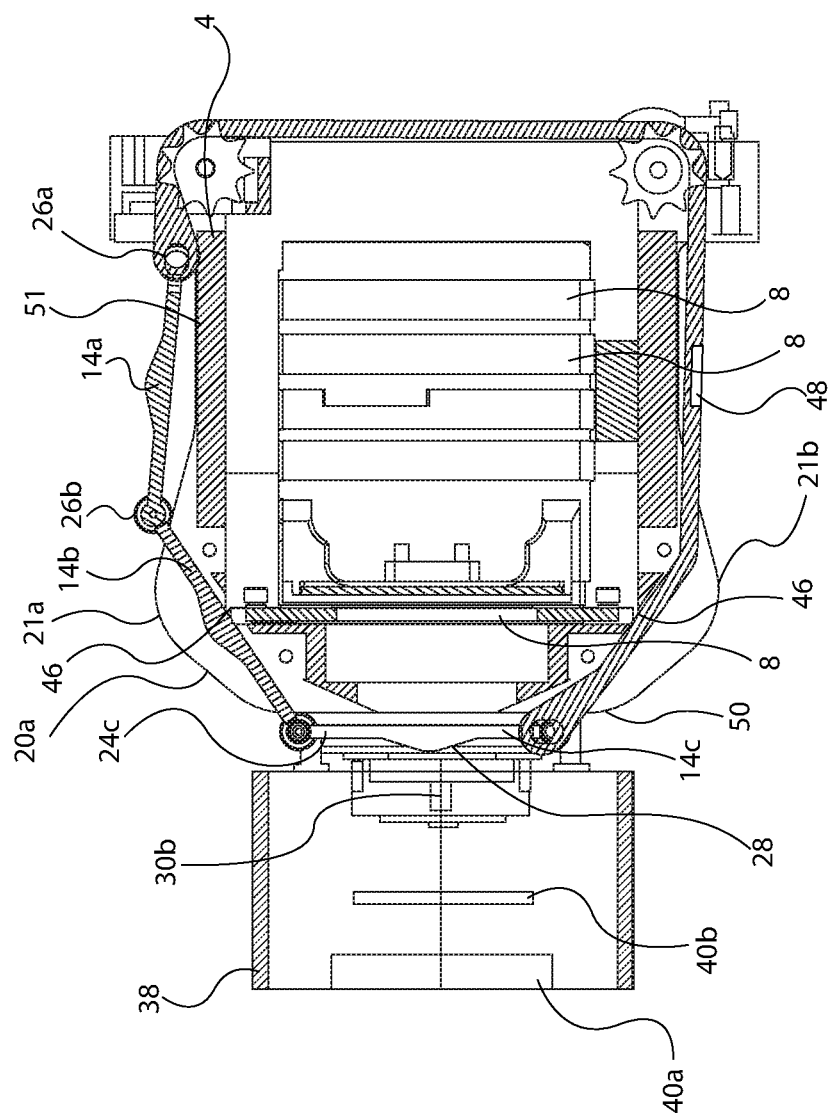
FIG. 14 illustrates a cross-sectional side view of the optical system of FIG. 1, wherein the optical system is operable with an enclosure, also shown in cross-section.
Figure 15:
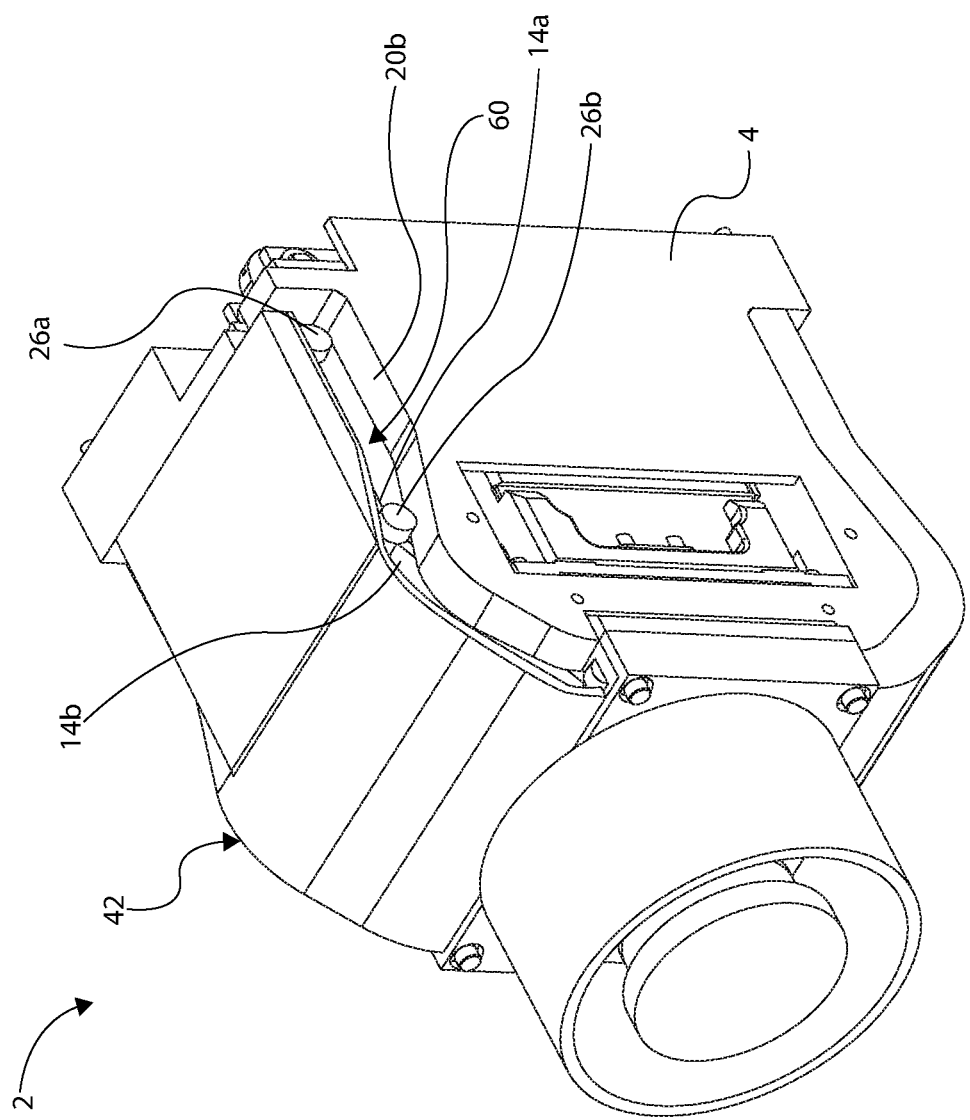
FIG. 15 illustrates a isometric view of the optical system of FIG. 1 showing a cover, with a portion of the cover hidden from view to illustrate the guide channel.

The enclosure 38 can be attached to the housing 4 via fasteners or any other fastening or coupling means or system and can have and support one or more biasing mechanisms (see biasing mechanisms 30*a* and 30*b* of FIG. 5A) operable to interface with respective protrusions 28 of the carrier 14*c* as it is brought into position and as it is maintained in position within the optical prescription center 12 between the enclosure 38 and the housing 4. The one or more biasing mechanisms 30*a* and 30*b* can be configured to align with and apply or provide a force or pressure on the protrusions 28 as the protrusions 28 are caused to interface with the biasing mechanisms 30*a* and 30*b* when the carrier 14*c* is coming into, and positioned in, the optical prescription center 12. The biasing mechanisms 30*a* and 30*b* of the enclosure 38 can stabilize the carrier 14*c* in the optical path 10 by applying a force or pressure to the protrusions 28, and thus the frame 24*c* of the carrier 14*c*, in order to force it against or maintain its position against the housing 4. In other words, the biasing mechanisms 30*a* and 30*b* operate to prevent lift-off of the carrier 14*c* from the housing 4 when in the optical prescription center 12. In some examples, the location of the protrusions 28 and the biasing mechanisms 30*a* and 30*b* can be reversed, wherein the protrusions 28 can be located on the enclosure 38 and the biasing mechanisms 30*a* and 30*b* can be located on the frame 24*c*. The enclosure 38 can include and support one or more optical components in the optical path 10. For example, the enclosure 38 can support two lenses 40*a* and 40*b*, as shown in FIG. 14.

The one or more biasing mechanisms 30*a* and 30*b* can comprise any elastic or compliant component or system capable of being at least partially compressed by the protrusions 28 as the carrier 14*c* moves into position in the optical prescription center 12, and capable of acting on the protrusions 28 and the carrier 14*c* to apply a force to the carrier 14*c* from any stored potential energy. Example biasing mechanisms can include, but are not limited to, one or more springs, one or more elastomers, or other compliant devices or systems, or combinations of these. In the example shown in FIG. 5B, the biasing mechanisms 30*a* and 30*b* can comprise a spring 31 seated within a recess formed in the enclosure body and a plunger 33 disposed on the spring 31. The plunger 33 can interface with the carrier 14*c* and the protrusion 28 formed on the carrier 14*c*. The enclosure 38 can attach to the housing 4 through one or more fasteners or via a joining interface connection between the housing 4 and the enclosure 38. The enclosure 38 can be supported by the housing 4 in a position so as to be within or about the optical path 10. The enclosure 38 can support one or more optical components, such as a lens, in the optical path 10. The optical component(s) supported by the enclosure 38 can be the same or similar types as those of the carriers 14*a-c*.

The carrier guide system 16 can be configured to provide the structure and means for facilitating the moveable support of the carriers 14*a-c* along or about the housing 4, and for switching the carriers 14*a-c*, and their respective associated optical components 22*a-c*, from a stowed out of the optical path 10 to a working position within the optical path 10 by moving and positioning the carriers 14*a-c* in different positions relative to the housing 4. The carrier guide system 16 can comprise any housing interfaces 18 of the carriers 14*a-c*, respectively, which housing interfaces 18 are configured to receive and interface or interact with a carrier interface 19 formed on or about the housing 4.

In the example shown, which is not intended to be limiting in any way, the housing interface 18 can include a rotatable component, such as bearings or wheels, operably supported by the carriers 14*a-c*, and the carrier interface 19 can comprise first and second tracks 20*a* and 20*b* formed about opposite sides of the housing 4, which tracks 20*a* and 20*b* are configured to receive the wheels or wheel sets 26*a-d* on the respective carriers 14*a-c*. It is noted that the first and second tracks 20*a* and 20*b* comprise an example configuration and are formed in an exemplary way about the housing 4. However, this is not intended to be limiting in any way. Those skilled in the art will recognize that the housing 4 can comprise many different form factor configurations. In addition, the carrier interface 19, and particularly the first and second tracks 20*a* and 20*b*, can be configured in many different ways and can be formed about the housing in many different ways. For example, in the example shown, the first and second tracks 20*a* and 20*b* are configured to facilitate the carriers 14*a-c* moving above and below the sensor 8. Alternatively, and just as easily, the first and second tracks 20*a* and 20*b* could run side to side, such that the carriers 14*a-c* move from one side of the sensor 8 to the other side of the sensor 8 about the housing 4. Indeed, it is contemplated that a housing, an optical element switching mechanism and various other components of an optical system can be configured in many different ways to achieve a similar purpose and function as the exemplary optical system 2 shown and discussed herein, one of such purpose and functions being to maintain the optical elements or components carried by the carriers in a position as close as possible to the center axis of the optical path 10, such that the swept volume is minimized for optimal packaging.

In this disclosure, wheels 26*a-d* are broadly interpreted to represent any rotatable supports or components, such as bearings or gears. Those skilled in the art will recognize that bearings, gears, or other rotatable supports can replace the wheels or wheel pairs 26*a-d* on either the housing interface 18, the carrier interface 19, or both. Each of the carriers 14*a-c* can comprise or utilize a first pair and a second pair of wheels (see pairs of wheels 26*a-d*), one supported on each end of the carrier. In the example shown, some of the pairs of wheels are each operable with two adjacent carriers (e.g., see pair of wheels 26*b* that operate to support carrier 14*a* and 14*b*, and pair of wheels 26*c* that operate to support carrier 14*b* and 14*c*). However, one skilled in the art will recognize other example components or devices or systems that the housing interface could be comprised of that could similarly moveably support the carriers 14*a-c* about the housing 4. For example, wheel pairs 26*a-d* can be replaced with pins operable to slide along and follow the tracks. The carriers 14*a-c*, or components thereof or operable therewith, can be configured to have, or can be made from a material having, a low coefficient of friction used to slidingly guide the carriers 14*a-c* through carrier guide system 16 (e.g., along the first and second tracks 20*a* and 20*b*). In one example, the frames 24*a-c*, if properly configured, can serve as housing interface 18 and slide about housing 4 without any additional interface structures or systems. The wheel pairs 26*a-d* can be located at and operable with the hinged mechanisms pivotally coupling the carriers 14*a-c* together. In one example, the hinged mechanisms 34 can comprise a pin coupling the carriers 14*a-c* together, which pin can extend beyond the edges of the carriers 14*a-c* to some degree to rotatably couple the wheel pairs 26*a-d*, respectively.

In the example shown, which is not intended to be limiting in any way, the carrier interface 19 can comprise first and second tracks 20*a* and 20*b*, as mentioned. Alternatively, the carrier interface 19 could comprise other structural components or members or elements, such as a channel, a rail or rail system, and still others as will be recognized by those skilled in the art, each of which can be configured to be operable to receive the carriers 14a-c, and particularly to interact and interface with the housing interface 18 of the carriers 14a-c, to facilitate movement of the carriers 14a-c about the housing 4.

As indicated, the carrier guide system 16 functions to facilitate and promote movable support of the carriers 14a-c along the first and second tracks 20a and 20b of the housing 4. More specifically, the carrier guide system 16 operates to move and support any one of the carriers 14a-c in the optical prescription center 12 of the optical path 10, as well as to move and support the carriers 14a-c out of the optical path 10. Advantageously, the carrier guide system 16 provides low profile movement and support of the carriers 14a-c relative to the housing 4, meaning that the moveable carriers 14a-c do not occupy a great amount of space beyond that defined by an envelope of the housing 4 (an envelope of the housing 4 being defined by the outer perimeter surfaces of the housing 4 that occupy a three-dimensional volume of space). For example, the carrier guide system 16 can include the housing interface 18 connected to the carriers 14a-c that travels along the carrier interface 19 within the housing 4. In one example, the carrier guide system 16 can be at least partially defined by the housing 4. In another example, the carrier guide system 16 can be at least partially defined by the housing 4 and a cover 42 (shown in FIG. 15), each of which will be described more fully below.

The first and second tracks 20a and 20b can be formed about a perimeter of the housing 4, and particularly about opposing sides or peripheral boundaries 46 of the housing 4. The first and second tracks 20a and 20b can extend along different surfaces of the housing 4 extending in different directions, and thus the first and second tracks 20a and 20b can comprise track sections that extend in different directions, and that are oriented along different axes. For example, with respect to the first track 20a, the first track 20a can comprise a first track section that extends along a first surface 48 of the housing 4. The first track section can transition into a first cam section 21a comprising an elevated height relative to the housing 4 than the first track section of the first track 20a. In other words, the first cam section 21a can be configured to follow a path that deviates somewhat from the peripheral boundary 46 of the housing 4. The first cam section 21a can be formed and located about the intersection of the first surface 48 and a second surface 50 of the housing 4. The first cam section 21a can transition into a second track section extending about the second surface 50 of the housing 4, which second surface 50 at least partially defines the prescription center 12. The first and second track sections can extend along axes that are transverse to one another. The second track section can transition into a second cam section 21b comprising an elevated height relative to the housing 4 than the second track section. The second cam section 21b can be formed and located about the intersection of the second surface 50 and a third surface 51 of the housing. The second cam section 21b can transition into a third track section extending about the third surface 51. It is noted that the second track 20b can be configured to comprise first, second and third track sections, as well as first and second can sections 21c and 21d that are each configured the same or similar to those of the first track 20a, and thus the second track is not discussed in detail herein.

The first and second tracks 20a and 20b can be spaced apart from one another a distance that is greater than a width of the frames 24a-c of the carriers 14a-c, such that the carriers are able to fit and move between the first and second tracks 20a and 20b. Relative sizing between the carriers 14a-c and the first and second tracks 20a and 20b as described can permit the housing interface 18 (the wheel pairs 26a-d) of the carriers 14a-c to interact and interface with the first and second tracks 20a and 20b (e.g., the wheel pairs 26a-d can roll along the first and second tracks 20a and 20b), while at the same time providing adequate spacing for the carriers 14a-c, and particularly the frames 24a-c of the carriers 14a-c to be able to be positioned between the first and second tracks 20a and 20b at select times (such as when the carriers 14a-c clear the sensor(s) supported in the housing 4) as the carriers 14a-c are caused to move along the first and second tracks 20a and 20b. Preventing interference of the frames 24a-c of the carriers 14a-c with the first and second tracks 20a and 20b is particularly beneficial as the carriers 14a-c transition from one position and orientation relative to the housing 4 out of the optical path 10 to a position and orientation relative to the housing 4 within the prescription center 12 and the optical path 10.

As the carriers 14a-c move along the first and second tracks 20a and 20b, they are caused to move in and out of the optical path 10. As the housing 4 can comprise surfaces in support of the carriers 14a-c that lie in different planes, and as the first and second tracks 20a and 20b are formed along these surfaces, the first and second tracks 20a and 20b therefore also comprise surfaces that lie in different planes. It thus follows that the carrier guide system 16 can be configured to facilitate movement of the carriers 14a-c along the first and second tracks 20a and 20b even as these change directions. Moreover, the housing 4 typically comprises a configuration or form factor that is sized just larger than the sensor(s) supported therein. For example, the housing 4 is sized to be as small as possible in relation to the sensor 8.

In order to accomplish the full range of movement of the carriers 14a-c, the first and second tracks 20a and 20b can comprise strategically formed and located cam sections (see cam sections 21a and 21b of first track 20a, and cam sections 21c and 21d of second track 20b), each being placed about an intersection (i.e., a corner of the housing 4) between two surfaces of the housing 4 oriented offset from one another (e.g., those lying in different planes). In the example shown, the first cam section 21a of the first track 20a and the first cam section 21c of the second track 20b can effectuate rotation and reorientation of the carriers 14a-c about the housing 4, and particularly the peripheral boundary 46 of the housing 4.

Although three carriers 14a-c are shown, only carrier 14a will be discussed here, for purposes of illustrating and explaining the movement of a single carrier about the housing 4, the carriers 14b and 14c operating similarly. Thus, in a first stowed position, with the frame 24a of the carrier 14a being supported about the first and second tracks 20a and 20b via the wheel pairs 26a and 26b being coupled to the frame 24a and resting upon the first and second tracks 20a and 20b, the carrier 14a can be positioned about the surface 48 of the housing 4, which stowed position is out of the optical path 10 (see stowed position of the carrier 14a in FIGS. 1, 3, 4, 8 and 9). In the event the carrier 14a is desired to be placed within the prescription center 12, and the optical component 22a of the carrier 14a is desired to be placed within the optical path 10, the carrier 14a can be caused to move and slide relative to the housing 4, from its stowed position to a working position. In response to such movement, the wheel pairs 26a and 26b roll along the first and second tracks 20a and 20b. From the stowed position shown, movement a sufficient distance will cause the second wheel pair 26b of the carrier 14a to be the leading wheel pair and to encounter the first cam section 21a of the first track 20a and the first cam section 21c of the second track 20b. As the carrier 14a and the leading wheel pair 26b encounter the cam sections 21a and 21c, and as movement of the carrier continues about the cam sections 21a and 21c, a first end (e.g., a front) of the carrier 14a will be caused to elevate and the carrier 14a will be caused to pivot in a first direction. This elevation and pivoting of the carrier 14a can continue until the wheel pair 26b reaches the apex of the cam sections 21a and 21c. At this point, the pivoting of the carrier 14a in the first direction ceases. Further movement about the cam sections 21a and 21c can then cause the carrier 14a to begin to pivot in a second opposite direction as the wheel pair 26b moves beyond the apex of the cam sections 21a and 21c. At the same time, the first and trailing wheel pair 26a of the carrier 14a can encounter the cam sections 21a and 21c, thus causing a second end (e.g., a back) of the carrier to elevate relative to the housing 4 and to further pivot the carrier 14a in the second direction. Indeed, once the wheel pair 26a encounters the cam sections 21a and 21c and is forward the apex, this will increase the rate of the pivoting of the carrier 14a in the second direction. The wheel pair 26a can still be within the cam sections 21a and 21c to effectuate continued pivoting of the carrier 14a in the second direction. For illustration purposes, this particular described position of carrier 14a with the wheel pair 26b beyond the cam sections 21a and 21c, and the wheel pair 26a encountering and within the cam sections 21a and 21c can be the same position in which the carrier 14b is shown in the drawings (e.g., see FIGS. 4, 6-9, and 14). It is noted that in this position, the frame 24a of the carrier 14a is disposed between the first and second tracks 20a and 20b. In other words, both the frame 24a of the carrier 14a and the first and second tracks 20a and 20b can be configured, such that sufficient clearance is provided between these components to permit the carrier 14a to pivot in the first and second directions. Furthermore, the linear track sections and the cam sections 21a and 21c (these defining a track path) can be configured, such that sufficient clearance is provided between the frame 24a and optical component 22 of the carrier 14a and any surface of the housing 4, any component supported within the housing, and more particularly the one or more sensors 8 supported within the housing 4, as the carrier 14a is caused to travel the track path along the tracks 20a and 20b and as it is caused to change direction and orientation relative to the housing 4 as it moves between the different track sections and the cam sections 21a and 21c of the first and second tracks 20a and 20b. For example, the radius or curvature of the cam sections 21a and 21c can be calculated and configured such that no part of the carrier 14a comes into contact with the sensor 8 as it is being translated along the first and second tracks 20a and 20b, and particularly as it is being elevated and rotated relative to the housing 4 about a corner of the housing 4 by the cam sections 21a and 21c as it encounters these. Still continued movement of the carrier 14a in the same direction will subsequently cause the wheel pair 26b to move beyond the apex of and exit or clear the cam sections 21a and 21c. It is noted that, with the leading wheel pair 26b out of the cam sections 21a and 21c, the position of the wheel pair 26a while still within the cam sections 21a and 21c and relative to the apex will result in a changing rate of rotation or pivoting of the carrier 14a. For example, with the wheel pair 26a forward the apex of the cam sections 21a and 21c, the rate of rotation of the carrier 14a can increase. On the other hand, once the wheel pair 26a clears and is beyond the apex, the rate of rotation or pivoting of the carrier 14a will decrease. The rate of the pivoting of the carrier 14a within the cam sections 21a and 21c can depend on the particular shape or configuration of the cam sections 21a and 21c. Still continued movement of the carrier 14a in the same direction can cause the leading wheel pair 26b to move further along the linear track section about the optical path 10, and the trailing wheel pair 26a to exit the cam sections 21a and 21c to also be within the linear track section about the optical path 10. Movement of the carrier 14a can cease when the carrier 14a is properly positioned within the prescription center 12 and the optical component 22a is within the optical path 10. Proper positioning of the carrier 14a in the prescription center 12 can be assisted by the biasing mechanisms 30a and 30b, these being configured as detents, engaging and applying a force to the protrusions 28 on the carrier 14a. Again, for illustration purposes, this particular described position of the carrier 14a within the prescription center 12 with the optical component 22 lined up in the optical path 10 can be the same position in which the carrier 14c is shown in the drawings (e.g., see FIGS. 4, 6-9, and 14). Once the carrier 14a is no longer needed, it can be moved out of the prescription center 12 and the working position and returned to the stowed position by being moved in the opposite direction relative to the housing 4, thus reversing through the movements and positions just described. Alternatively, the carrier 14a can be caused to continue on in the same direction relative to the housing 4 to be stowed in a different or second stowed position along the third surface 51 of the housing. The particular direction the carriers 14a-c are driven will largely depend upon the particular carrier to be placed within the prescription center 12. To be positioned in the second stowed position, the carrier 14a can be caused to continue to traverse or travel along the first and second tracks 20a and 20b, where the carrier 14a will encounter cam sections 21b and 21d, respectively. The cam sections 21b and 21d can be configured the same as or similar to the cam sections 21a and 21c, and can be located opposite the cam sections 21a and 21c, and at the intersection (i.e., corner) of second and third surfaces 50 and 51 of the housing 4.

Those skilled in the art will recognize that the movement and positioning of the carriers 14b and 14c from one or more stowed positions to a working position within the prescription center 12 can be the same as that just described for carrier 14a, and as such, these are not described in detail herein.

Those skilled in the art will further recognize that the track path provided by the carrier guide system 16 can be configured in many different ways to provide clearance for any part of the housing 4, any component supported by the housing 4, or any part of the overall optical system 2. As such, the specific configurations shown in the drawings and discussed herein are not intended to be limiting in any way.

The optical system 2, and particularly the optical element switching system 6, can further comprise a drive system 32 operable to move the carriers 14a-c about the housing 4 via the carrier guide system 16. The drive system 32 is operable to position any of the carriers 14a-c in one of a stowed position out of the optical path 10, and a working position in the prescription center 12 so as to place an associated optical component 22 within the optical path 10. In one example, the drive system 32 can comprise a driver, which can comprise, in one example, a belt 36. The belt 36 can be connected to the two end carriers in the collection of carriers 14a-c, which in this example are the carriers 14a and 14c, and can further extend about the housing 4 and can be operable with one or more pulleys, at least one of which can be driven by a motor 44. The belt 36 can be operably joined or otherwise coupled or secured to the carriers 14*a* and 14*c* so as to be able to pull on the collection of carriers 14*a-c* from different directions to move the collection of carriers 14*a-c* in a bi-directional manner about the first and second tracks 20*a* and 20*b*. As such, the motor 44 can be configured to drive the belt 36 in a bi-directional manner. The motor 44 can be driven in a first direction to pull on carrier 14*a*, thus driving the collection of carriers 14*a-c* in the first direction. Likewise, the motor 44 can be driven in a second direction to pull on the carrier 14*c*, thus driving the collection of carriers 14*a-c* in the second direction. The motor 44 can be operated as needed or desired to position any one of the carriers 14*a*, 14*b* or 14*c* in a stowed position out of the optical path 10, or in a working position within the prescription center 12 with its associated optical component 22 in the optical path. In other words, the motor 44 can be operated to switch the carriers 14*a-c* in and out of the optical path.

In one example, as shown, the belt 36 can attach to the carriers 14*a* and 14*c* (as these are the carriers at each end of the collection of carriers 14*a-c*) by being looped through apertures 25*a* and 25*c* in the frames 24*a* and 24*c* of the carriers 14*a* and 14*c*, respectively. The belt 36 can be configured such that it can then be directed around the housing 4. Specifically, from the carrier 14*a*, the belt can extend about the housing 4 and directed to an idler pulley 41 supported about the housing 4 where the belt 36 can engage and interface with the idler pulley 41 operable to receive and rotatably support the belt 36, and to provide a guide for the belt 36 about the housing 4. The idler pulley 41 can be adjustably secured to the housing 4 so as to facilitate adjustment of the tension of the belt 36. In the example shown, the idler pulley 41 can be supported by brackets coupled to the housing 4. The brackets, and therefore the idler pulley 41, can be movably supported to the housing 4 so as to facilitate adjustment of the brackets and the idler pulley 41 in a bi-directional manner relative to the housing 4. The idler pulley 41 can be adjusted by loosening the one or more fasteners securing the brackets to the housing 4, and sliding the brackets and the idler pulley 41 in one of two directions to either increase or decrease the tension in the belt 36. Of course, this type of tensioning system is not intended to be limiting in any way as other systems or mechanisms are possible and contemplated herein to achieve the proper or desired tension in the belt 36. For example, the idler pulley 41 could be spring loaded to automatically adjust to the correct or proper tension, or in addition or in the alternative, any number of spring loaded belt supports could be secured to the housing at positions where the belt 36 travels. Providing a spring loaded idler pulley 41 (and/or any points along the travel of the belt 36) would be particularly advantageous because when the roller bearings roll over different areas of the cam, since the carrier frames are rigid, the tension on the belt will change. Having a spring loaded belt tension allows these small drive belt length changes without binding or losing belt preload. Once the proper or desired tension in the belt 36 has been achieved, the one or more fasteners can be tightened to secure the brackets and the idler pulley 41 in place.

From the idler pulley 41, the belt 36 can be directed to a drive pulley 43 operable to be driven by the motor 44. The drive pulley 43 can be supported by the housing 4, and either directly or indirectly coupled to the motor 44, such that actuation of the motor 44 in turn drives the drive pulley 43. Driving of the drive pulley 43 in turn rotates the belt 36, which in turn drives the collection of carriers 14*a-c* along the housing 4. From the drive pulley 43, the belt 36 can be directed to the carrier 14*c*, where it can be looped through an aperture 25*c* formed in the frame 24*c* of the carrier 14*c*. Between the drive pulley 43 and the carrier 14*c*, one or more friction reducing elements can be used and supported by the housing 4. In one example, friction reducing elements in the form of bushings or roller bearings 27 can be rotatably supported by the housing 4. The belt 36 can be caused to engage these so as to minimize wear and friction between the belt 36 and the housing 4 as the belt moves along the housing 4. The bushings or roller bearings 27 can be supported by the housing at locations where the belt is caused to change directions due to the configuration of the housing 4, such as at the corners of the housing 4. Although not shown, additional bushings or roller bearings can be supported by the housing 4 at locations between the idler pulley 41 and the carrier 14*a*. Indeed, bushings or roller bearings can be located anywhere along the housing 4 where the belt 36 may experience friction and wear as it is driven along the housing 4. As such, the specific locations shown and discussed herein are not to be limiting in any way. Furthermore, those skilled in the art will recognize that bushings or roller bearings are only two examples of friction reducing elements that can be used, and that other types could be employed, each of which are contemplated herein.

The belt 36 can therefore extend from the carrier 14*a*, to the idler pulley 41, to the drive pulley 43, and to the carrier 14*c*. As such, the belt 36 and the collection of carriers 14*a-c* can define and form a loop that extends around and about the housing 4. The drive system 32, and particularly the idler pulley 41, the drive pulley 43 and the motor 44, can be supported about a side of the housing 4 so as to be out of the way of the carrier guide system 16 and the moving carriers 14*a-c*, and so the drive system 32 does not interfere with the switching of the carriers 14*a-c* in and out of the optical path 10 and the prescription center 12 that can be located on an opposite side of the housing 4 from the elements of the drive system 32.

The drive system 32 can be operated to slide the collection of pivotally coupled carriers 14*a-c* along the housing 4, wherein the carriers 14*a-c* are maintained in a close position relative to the housing 4. The single drive motor 44 can be actuated to rotate the carriers 14*a-c* from a first position (e.g., with the carrier 14*c* in the optical path 10) to a second position (e.g., with the carrier 14*b* in the optical path 10) and to a third position (e.g., with the carrier 14*a* in the optical path 10). Of course, other interim positions are possible by selectively actuating and deactivating the drive system 32.

Although a bi-directional motor 44 is discussed, this is not intended to be limiting in any way. In another example, the motor 44 can comprise a unidirectional motor. In this case, the carrier guide system 16 could be configured to extend the entire way around the housing 4 (e.g., the first and second tracks 20*a* and 20*b* could form an endless or continuous loop around the housing 4), such that the collection of carriers 14*a-c* are driven in a single direction. Alternatively, two unidirectional motors could be used to drive the belt in a bi-directional manner by selectively actuating the two motors depending upon the desired direction of travel of the carriers 14*a-c*. Again, those skilled in the art will recognize the many different possible design possibilities for the optical system 6, including the housing 4 and the optical element switching system 6 operable with the housing 4 as discussed herein.

It is noted that in another example, the driver can comprise a chain instead of a belt, which chain can be operable with an idler sprocket and a drive sprocket that function similar to the belt and the associated idler and drive pulleys. Those skilled in the art will recognize that the driver can comprise still other types, such as a rope, rod, or other device or mechanism operable to transfer force from drive system 32 to the carriers 14a-c.

As discussed herein, the carrier 14a-c can be pivotally connected to one another, such as via hinged connections, thus resulting in a continuous collection of carriers that can be held close to the housing and that can move or slide relative to the housing 4 so as to reduce the overall packaging envelop of the optical system 2. The physical coupling of the carriers 14a-c to one another can facilitate the transfer of driving forces (e.g., pulling forces) generated by the drive system 32 that act on one carrier (e.g., carrier 14a or 14c) to the remaining carriers 14a-c, thus allowing the collection of carriers 14a-c to move as a collective group or whole. Those skilled in the art will recognize that the carriers 14a-c can be pivotally coupled to one another via any rotatable and/or pivotal connection type that permits the transmission of driving force from one carrier to another.

The optical system 2 can further comprise a cover (e.g., see cover 42 in FIG. 15) coupled or otherwise secured to the housing 4. With the example shown, the cover 42 can be used to provide protection for the various components of the optical system 2. The cover can be configured in a variety of ways. In one example, the cover 42 can be configured so as to at least partially define the carrier guide system 16 of the optical element switching system 6. In other words, the cover 42 can form a part of the carrier guide system 16, and can be sized and configured to facilitate the switching of the carriers in and out of the optical path 10. For example, the cover 42 can be coupled to the housing 4 so as to be spaced a distance from the surfaces of the first and second tracks 20a and 20b to provide clearance to the carriers 14a-c as they move along the housing 4, and as they are switched in and out of the optical path 10.

As part of the carrier guide system 16, the cover 42 can comprise a surface contour, shape or form that matches or otherwise corresponds to the contour, shape or form of the first and second tracks 20a and 20b. The cover 42 can cover all or a part of the housing 4 and the first and second tracks 20a and 20b. As so configured, and as a result of the offset distance of the cover 42 from the first and second tracks 20a and 20b, a portion of the cover 42 and the first track 20a can define a first guide channel (not shown). Likewise, a portion of the cover and the second track 20b can define a second guide channel (see guide channel 60). With reference to the only guide shown, the guide channel 60 can operate to facilitate the moveable support of the carriers 14a-c along the second track 20b of the housing 4. Moreover, the guide channel 60 can maintain the carriers 14a-c against the second track 20b and can prevent lift-off of the carriers 14a-c through at least some, or all, of the range of motion of the drive system 32 and the carriers 14a-c. The guide channel 60 can be configured to receive the housing interlace 18 of the carriers 14a-c. In the example shown, the housing interface 18 on each of the carriers 14a-c comprises first and second wheel pairs (see wheel pair 26a operable with carrier 14a, and wheel pair 26b operable with carriers 14a and 14b). In this example, the guide channel 60 can be configured to receive the wheels, and to facilitate the rolling of the wheels within the guide channel in response to movement of the carriers 14a-c by the drive system 32.

Although not discussed or shown, a similar guide channel can be formed with the cover 42 and the first track 20a, which guide channel can function in a similar manner as guide channel 60, as will be recognized by those skilled in the art.

With reference to FIGS. 1-14 and 16, shown is an example collection or group of carriers 14a-14e operable within the optical element switching system 6 of the optical system 2 described above. This example illustrates that more than the three carriers 14a-c can exist within the optical element switching system 6. Each of the carriers 14a-e can comprise a frame (see frames 24a-e, respectively) comprising at least one hinged connection (see hinged connections 34a-d). The frames can be in support of one or more optical elements or components (see optical components 22a-e). As shown, the carriers 14a-e can each comprise an optical component in the form of a filter. However, this is not intended to be limiting in any way as any one or more of the carriers 14a-e can comprise an optical component of a different type. As such, the optical components do not need to comprise the same type. The additional carriers 14d-e can each be configured similarly as the carriers 14a-c, and can function in a similar manner as the carriers 14a-c.

Figure 17:
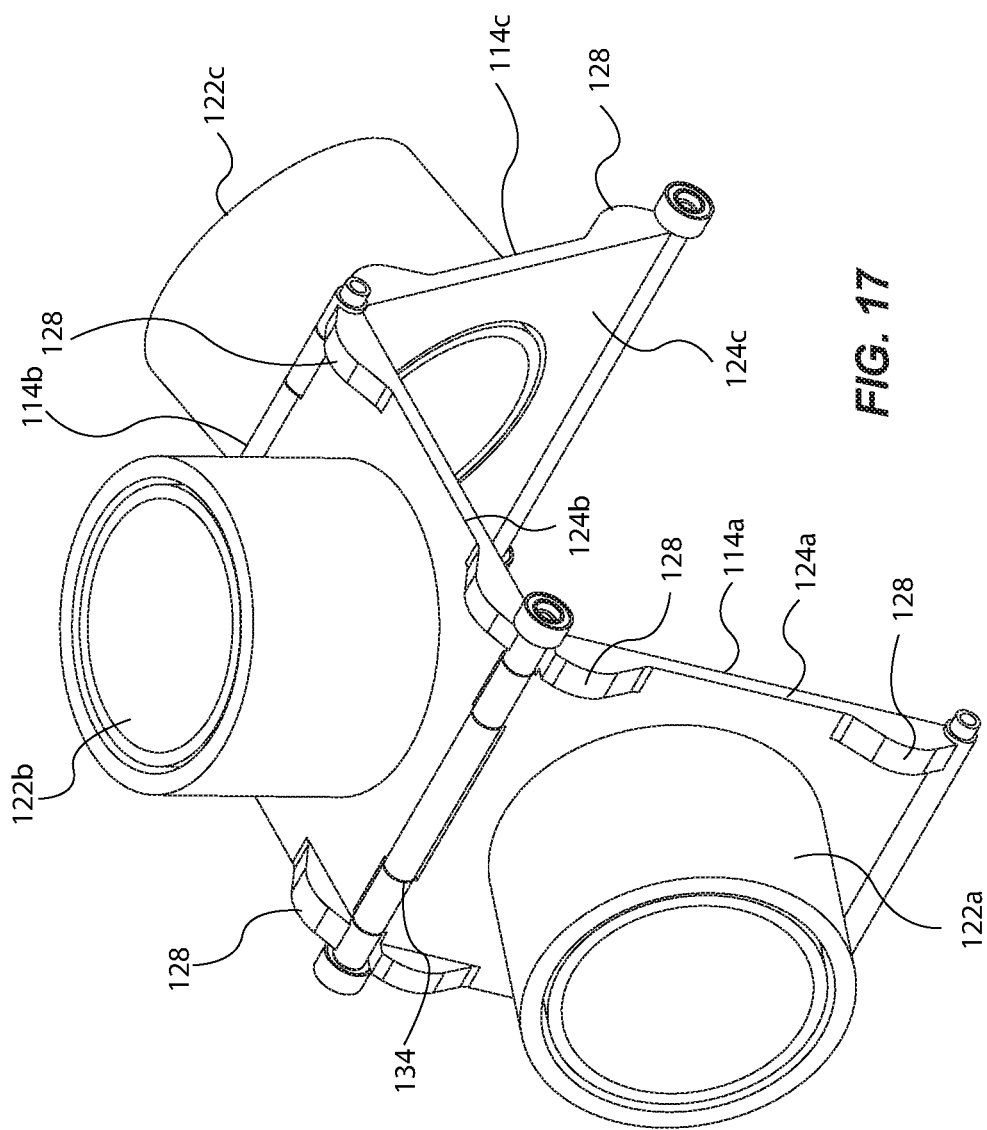
FIG. 17 illustrates the carriers of the optical system of FIG. 1 shown with a different type of optical component supported about the carriers.

With reference to FIGS. 1-14 and 17, shown is an example collection or group of carriers 114a-c operable within the optical element switching system 6 of the optical system 2 described above. This example illustrates the carriers 114a-c, being rotatably coupled together via hinge mechanisms 134, as comprising optical components in the form of lenses (see optical components 122a-c, respectively). The lenses can be supported about the frames 124a-c, respectively. FIG. 17 further illustrates each carrier 114a-c comprising a plurality of protrusions 128 formed on or in the frames 124a-c, respectively, which protrusions 128 can interface with respective biasing components within the enclosure 38 in a similar manner as discussed above and for the same or similar purposes, such as to facilitate the proper positioning of the carrier(s) within the optical path 10 and/or to stabilizing the carrier(s). In this example, the plurality of protrusions 128 are shown as being located in respective corner quadrants of the frames 124a-c. However, protrusions can be located anywhere on the frames 124a-c of the carriers 114a-c, they can comprise many different sizes and configurations, and they can exist in any number or amount. For example, a carrier can comprise protrusions along a side, top, or bottom of its frame. As will be recognized by those skilled in the art, the protrusions 128 can perform the same or similar functions as the protrusions discussed above.

Figure 16:
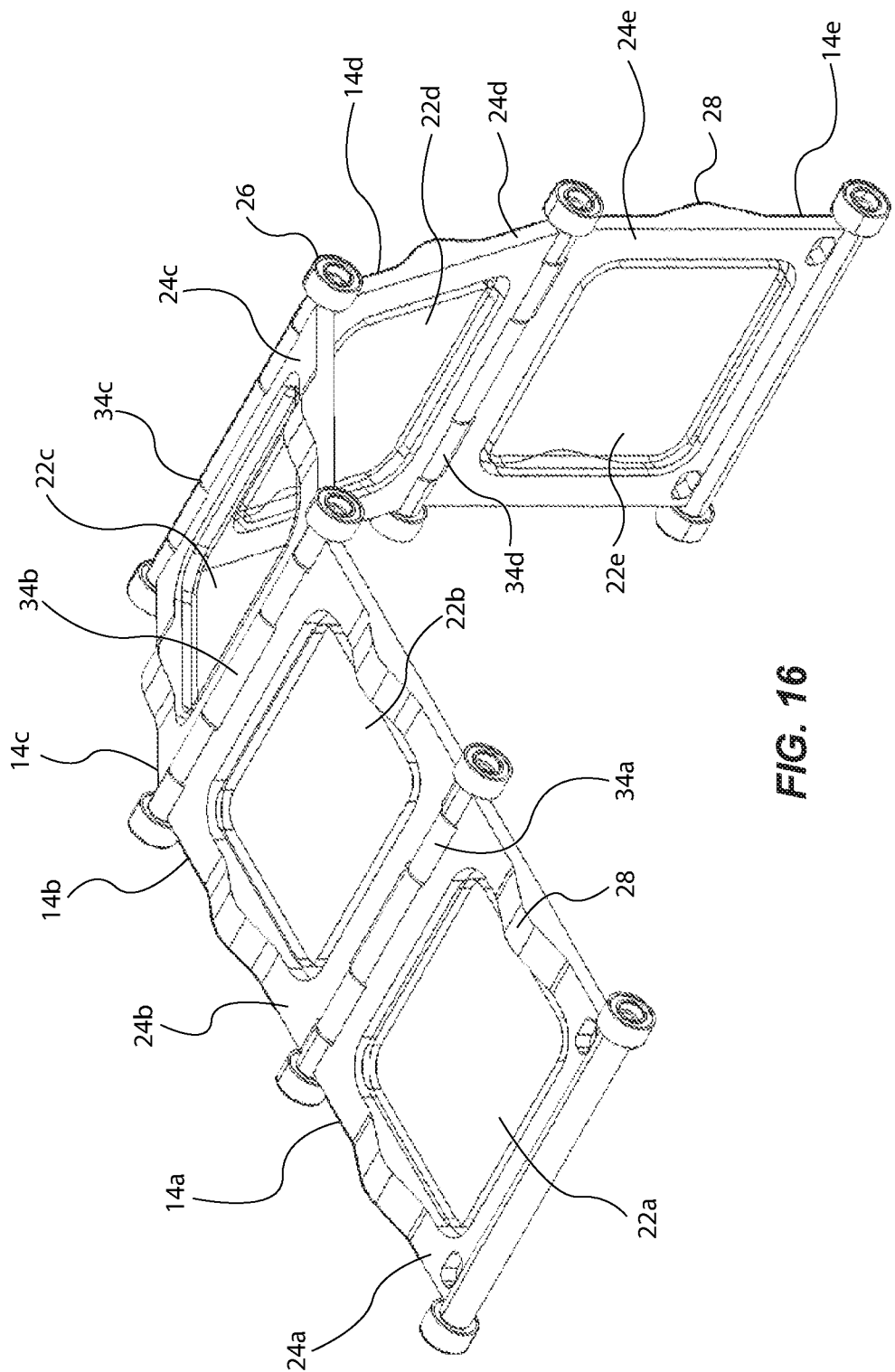
FIG. 16 illustrates a collection of five carriers pivotally coupled together via a hinge mechanism that could be used with the optical system of FIG. 1.

FIGS. 16 and 17 demonstrate the ability to connect different optical components to the optical system 2, how hinged connections can be used to pivotally couple any number of carriers, and how the protrusions on the frames of the carriers can exist in different locations and in different amounts. However, still other alternative examples will be readily apparent to those having ordinary skill in the art.

Figure 18A:
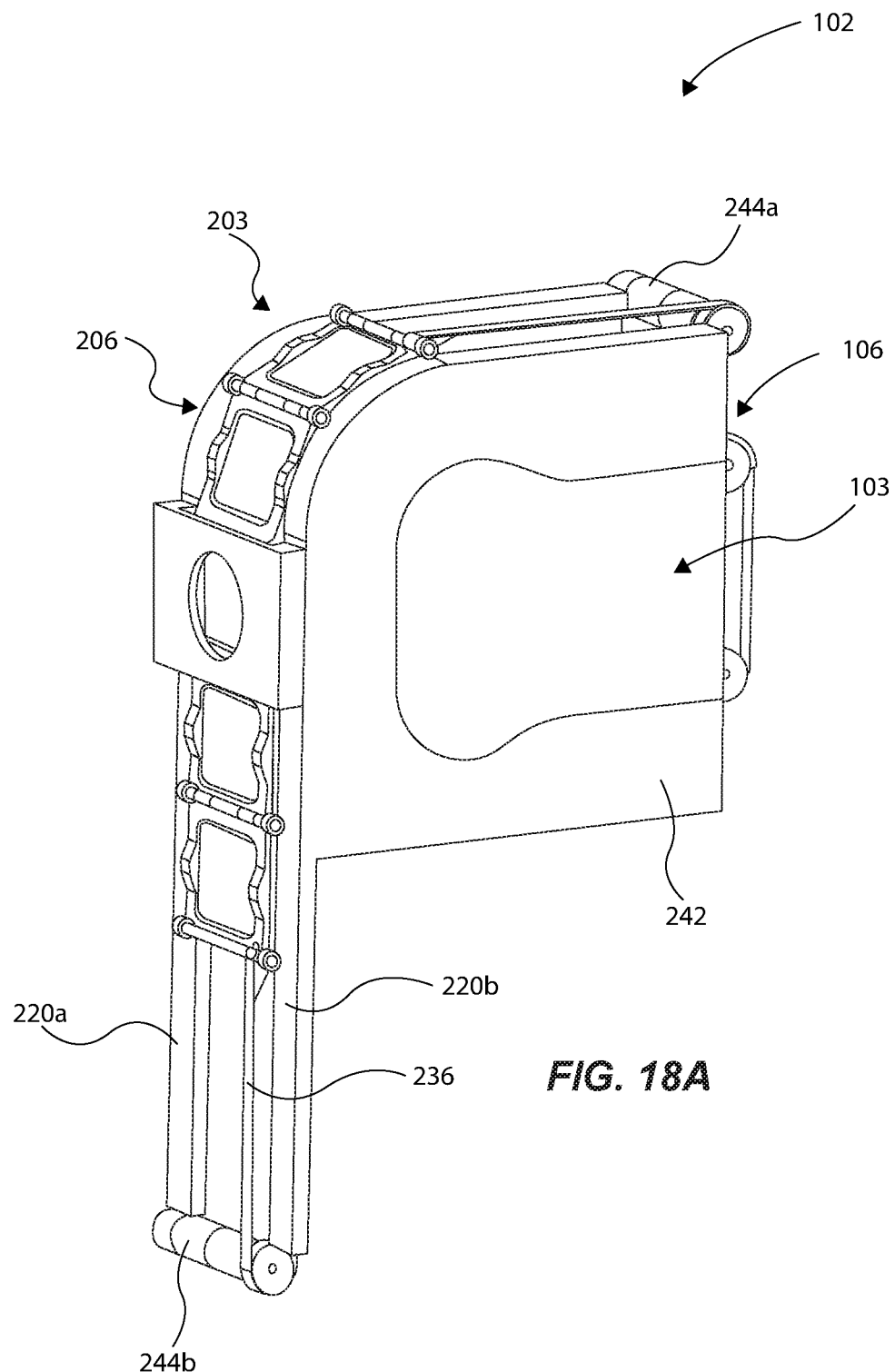
FIG. 18A illustrates an optical system in accordance with another example of the present disclosure, the optical system comprising a plurality of optical element switching systems operable to switch supported optical components in and out of the optical path, and to selectively layer optical components within the optical path.
Figure 18B:
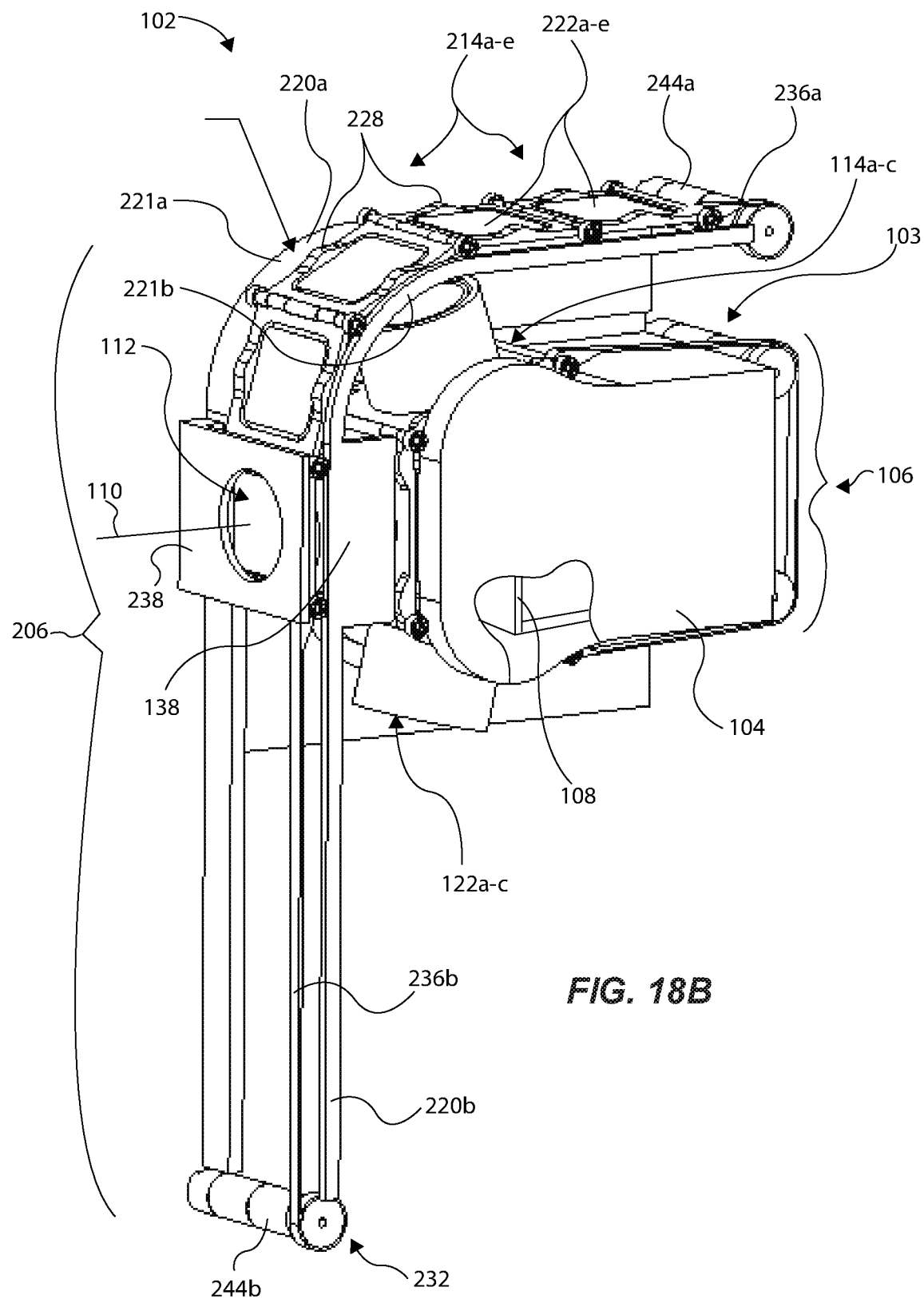
FIG. 18B illustrates the optical system of FIG. 18A, with a portion of the cover hidden from view.

With reference to FIGS. 18A and 18B, illustrated is an optical system 102 in accordance with another example. The optical system 102 can comprise first and second optical devices 103 and 203, a housing 104, and one or more sensors 108 disposed in and supported by the housing 104, which housing 104 and sensor(s) 108 can be configured and function similarly as the sensors discussed above. For instance, the housing 104 can define an optical path 110 of a signal (e.g., light or electromagnetic waves), wherein the optical path 110 can facilitate the signal passing to and contacting the one or more sensors 108 disposed within the housing 104. The optical path 110 can include an optical prescription center 112. The optical system 102 can further comprise a plurality of optical element switching systems (see optical element switching systems 106 of optical device 103, and optical element switching system 206 of optical device 203) supported by the housing 104. The optical element switching system 106 can comprise a plurality of carriers 114*a-c* with associated optical components 122*a-c*. Likewise, the optical element switching system 206 can comprise a plurality of carriers 214*a-e* with associated optical components 222*a-e*. The carriers 114*a-c* and 214*a-e* can be the same or similar to the carriers 14*a-c* (or various examples thereof) discussed above.

The plurality of optical element switching systems 106 and 206 are operable to selectively switch the plurality of carriers 114*a-c* and 214*a-e*, respectively, and their associated optical components 122*a-c* and 222*a-e*, respectively, in and out of the optical path 110, wherein the plurality of optical components 122*a-c* and 222*a-e*, for example any optical component from each of the optical element switching systems 106 and 206, can simultaneously be switched into the optical path 110 to affect or act upon the signal interaction with the sensor(s) 108. In other words, any one of the optical components from each of the optical element switching systems 106 and 206 can be switched into the optical path at the same time to provide layered optical components that together affect or act upon the signal. Or, any optical component from one of the first and second optical element switching system 106 and 206 can be switched into the optical path 110, while the optical components from the other of the first and second optical element switching systems 106 and 206 can be positioned in a stowed position. In other words, in some cases it may be desirable to switch only a single optical component in the optical path, which optical component can be selected from either of the first and second optical element switching systems 106 and 206.

The optical device 103 and the optical element switching system 106 can be the same or similar to the example optical system 2 and optical element switching system 6 discussed above and shown in FIGS. 1-15 (or any alternative examples, as discussed). Therefore, the optical element switching system 106 will not be discussed in detail, as the above discussion is incorporated here, as will be recognized by those skilled in the art.

The optical device 203 and the optical element switching system 206 can be coupled or otherwise secured to the housing 104, and positioned above the optical element switching system 106 as shown, such that the optical element switching system 206 is positioned outside of the enclosure 138 and can also function in a similar manner as the optical element switching system 106 (or optical element switching system 6, as discussed above). However, unlike the optical element switching system 106, the optical element switching system 206 can comprise an asymmetric carrier guide system comprising a housing interface (wheel pairs supported on the carriers 214*a-e*) and a carrier interface having first and second tracks 220*a* and 220*b* configured to extend in two directions about the optical prescription center 112, wherein the first and second tracks can comprise first and second cam sections 221*a* and 221*b* having a radius r. The first and second tracks 220*a* and 220*b* can be spaced apart from one another a sufficient distance so as to provide clearance of the carriers 214*a-e*, and specifically the frames 224*a-e* of each of the carriers 214*a-e* (i.e., the frames 224*a-e* can fit between the tracks 220*a* and 220*b*). Furthermore, the radius r of the first and second cam sections 221*a* and 221*b* can be sized and configured, such that the carriers 214*a-e* clear any components or elements of the optical device 103 and the optical element switching system 106, or any other components of the optical system 102 (such as the optical components 122*a-c*). It is noted that FIG. 18A illustrates housing 242 operable with the second optical device 203, which can be secured to the housing 104 of the first optical device 103 (or to another ground housing not shown).

The optical element switching system 206 can further comprise a drive system 232 comprising a first belt 236*a* coupled to an end carrier 214*a*, and a second belt 236*b* coupled to end carrier 214*e*. The first belt 236*a* can be operable with a spool drivable by a first motor 244*a* to drive (pull) the collection of carriers 214*a-e* in a first direction, and the second belt 236*b* can be operable with a spool drivable by a second motor 244*b* to drive (pull) the collection of carriers 214*a-e* in a second direction. The first and second motors can be selectively actuated to bi-directionally drive the collection of carriers 214*a-e* to switch these in and out of the optical path 110. Of course, the drive system 232 can be configured differently, such as to comprise a single motor capable of bi-directional driving of the collection of carriers 214*a-e*. Still other drive systems are possible to drive the carriers 214*a-e*, which drive systems will be apparent to those skilled in the art.

The optical element switching system 206 can further comprise a stabilizer 238 about the prescription center 212 that operates to stabilize and/or properly position any of the carriers 214*a-e* once switched into the optical path 110. The stabilizer 238 can comprise one or more biasing mechanisms (not shown) operable to interface with respective protrusions 228 of the carriers 214*a-e* as they are brought into position and as they are maintained in position within the optical prescription center 112 between the stabilizer 238 and the first and second tracks 220*a* and 220*b*. The one or more biasing mechanisms can be configured to align with and apply or provide a force or pressure on the frames 224*a-e* of the carriers 214*a-e*, respectively, and particularly to any protrusions 228 of the frames 224*a-e* as the protrusions 228 are caused to interface with the biasing mechanisms when the carriers 214*a-e* come into, and are positioned within, the optical path 110. The biasing mechanisms of the stabilizer 238 can stabilize the carriers 214*a-e* in the optical path 110 by applying a force or pressure to the protrusions 228, and thus the frames 224*a-e* of the carriers 214*a-e*, in order to force these against or maintain their position against the first and second tracks 220*a* and 220*b*. In other words, the biasing mechanisms operate to prevent lift-off of the carriers 214*a-e* from the first and second tracks 220*a* and 220*b* when in the optical prescription center 112 and the optical path 110. Essentially, the stabilizer 238 and the biasing mechanisms can be configured and can function similarly as the enclosure and the biasing mechanisms discussed above with respect to the examples shown in FIGS. 1-15.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, e.g., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An optical device, comprising:
a housing operable to support one or more optical sensors, the housing defining an optical path through an optical prescription center of the housing; and
an optical element switching system associated with the housing, the optical element switching system comprising:
a plurality of carriers movable about non-parallel sides of the housing, and each comprising a frame and an optical component supported by the frame;
a carrier guide system comprising a housing interface that engages a carrier interface, wherein the carrier guide system is operable to movably support the plurality of carriers relative to the housing; and
a carrier drive system operable to selectively move and position the plurality of carriers along the carrier guide system in and out of the optical path.

2. The optical device of claim 1, wherein the housing interface of the carrier guide system comprises a plurality of rotatable members supported about the carriers, and the carrier interface defines a path of travel for the plurality of carriers.

3. The optical device of claim 2, wherein the carrier interface comprises first and second tracks formed in the housing, and wherein the rotatable members comprise wheels supported about the respective frames of the plurality of carriers, wherein the wheels are operable to follow the first and second tracks upon movement of the plurality of carriers.

4. The optical device of claim 2, wherein the first and second tracks each comprise one or more linear track sections and one or more cam sections, at least some of the one or more linear track sections transitioning into the one or more cam sections, the cam sections being operable to elevate and rotate the carriers relative to the housing as the carriers are switched in and out of the optical path.

5. The optical device of claim 1, further comprising a cover operable to at least partially encase the housing, wherein the cover forms part of the optical element switching system, and at least partially defines first and second guide channels operable to receive the housing interface of the carriers.

6. The optical device of claim 1, wherein the plurality of carriers move about the housing in different orientations relative to the housing, each of the plurality of carriers being pivotal relative to one or more adjacent carriers.

7. The optical device of claim 1, further comprising an enclosure supported by the housing, the enclosure at least partially defining the optical prescription center, the plurality of carriers being positionable between the housing and the enclosure, and wherein the enclosure comprises at least one biasing mechanism.

8. The optical device of claim 7, wherein the respective frames of each of the plurality of carriers comprises a protrusion, and wherein the protrusions are operable to engage the at least one biasing mechanism of the enclosure upon being switched into the optical path, the biasing mechanism being operable to apply a force to the carrier for at least one of alignment or stabilization of the carrier.

9. The optical device of claim 1, wherein the carrier drive system comprises a driver connected to end positioned carriers of the plurality of carriers, and a motor actuatable to move a belt a predetermined distance to drive the plurality of carriers a predetermined distance to locate one of the plurality of carriers in the optical path.

10. An optical system, comprising:
a first optical device comprising:
a housing comprising a peripheral boundary, and defining an optical path through an optical prescription center;
a sensor disposed within the housing, the sensor defining, at least in part, the peripheral boundary of the housing; and
an optical element switching system comprising:
at least one carrier movable about the housing, the carrier comprising a frame and an optical component supported by the frame;
a carrier guide system comprising a housing interface that interfaces with a carrier interface that tracks, at least in part, the peripheral boundary of the housing, the carrier interface further comprising a cam section that deviates from the peripheral boundary and that effectuates rotation of the carrier as the carrier transitions from a first surface of the housing out of the optical path to a second surface of the housing containing the optical prescription center; and
a carrier drive system operable to selectively move and position the carrier along the carrier guide system in and out of the optical path.

11. The optical system of claim 10, wherein a configuration of the sensor defines a minimum size of the peripheral boundary of the housing, and wherein the cam section is defined by the minimum size of the peripheral boundary.

12. The optical system of claim 10, further comprising a second optical device operable with the housing, the second optical device comprising a second optical element switching system comprising a second plurality of carriers operable to be switched in and out of the optical path.

13. The optical system of claim 12, wherein the optical element switching system and the second optical element switching system can operate to layer optical components in the optical path, such that the optical path intersects an optical component from each of the first and second optical element switching systems.

14. A method for switching optical components in an optical system in and out of an optical path, the method comprising:
movably supporting a plurality of carriers about non-parallel sides of a housing, each of the carriers comprising an optical component;

locating a first carrier at an optical prescription center of the housing, such that the optical component of the first carrier is within an optical path, wherein a second carrier with its associated optical component is positioned out of the optical path;

rotating the second carrier about a cam section to orient the second carrier with the optical path; and operating a carrier drive system of a carrier guide system to move the first carrier out of the optical path and to locate the second carrier at the optical prescription center, such that the optical component of the second carrier is within the optical path.

* * * * *